(12) United States Patent
Gunji

(10) Patent No.: US 12,054,007 B2
(45) Date of Patent: Aug. 6, 2024

(54) TIRE

(71) Applicant: The Yokohama Rubber Co., LTD., Tokyo (JP)

(72) Inventor: Ryota Gunji, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 150 days.

(21) Appl. No.: 17/150,976

(22) Filed: Jan. 15, 2021

(65) Prior Publication Data
US 2021/0221180 A1 Jul. 22, 2021

(30) Foreign Application Priority Data
Jan. 17, 2020 (JP) ................. 2020-006288

(51) Int. Cl.
*B60C 11/03* (2006.01)
*B60C 11/04* (2006.01)
*B60C 11/11* (2006.01)

(52) U.S. Cl.
CPC .......... *B60C 11/0306* (2013.01); *B60C 11/04* (2013.01); *B60C 2011/0346* (2013.01);
(Continued)

(58) Field of Classification Search
CPC ..... B60C 2011/1213; B60C 2011/0346; B60C 2011/0381; B60C 2011/0355;
(Continued)

(56) References Cited

U.S. PATENT DOCUMENTS 4,223,712 A * 9/1980 Iwata ................. B60C 11/0309
D12/580
5,160,385 A * 11/1992 Goto ................... B60C 11/0309
152/209.19

(Continued)

FOREIGN PATENT DOCUMENTS

DE 28 38 114 A1 3/1979
DE 11 2008 001 558 T5 4/2010
(Continued)

OTHER PUBLICATIONS

Machine Translation JP 4770797 (Year: 2011).*
Machine Translation WO 2018-043553 (Year: 2018).*
JP 2019137340 machine translation (Year: 2019).*

*Primary Examiner* — Justin R Fischer
*Assistant Examiner* — Wendy L Boss
(74) *Attorney, Agent, or Firm* — Thorpe North & Western

(57) ABSTRACT

A tire includes circumferential main grooves, lug grooves, and land portions defined by the circumferential main grooves and the lug grooves. The circumferential main grooves extend in a circumferential direction. The lug grooves extend in a width direction, include shoulder and center lug grooves, and have an end opening to a circumferential main groove. Narrow shallow grooves in center and shoulder land portions have an end opening to a circumferential main groove and have a groove depth of 10-40% of a circumferential main groove depth. The shoulder lug grooves are on an outer side of a shoulder main groove in the width direction and have an end opening to the shoulder main groove. The center lug grooves are between the center and shoulder main grooves, have both ends opening to circumferential main grooves, and have a minimum width wider than a minimum width of the shoulder lug groove.

19 Claims, 18 Drawing Sheets

(52) U.S. Cl.
CPC ............... *B60C 2011/0348* (2013.01); *B60C 2011/0355* (2013.01); *B60C 2011/036* (2013.01); *B60C 2011/0365* (2013.01); *B60C 2011/0381* (2013.01); *B60C 2011/0388* (2013.01); *B60C 11/11* (2013.01)

(58) Field of Classification Search
CPC ..... B60C 2011/0365; B60C 2011/0362; B60C 2011/0367; B60C 2011/036; B60C 2011/1231; B60C 2011/133; B60C 2011/0348; B60C 2011/0344
See application file for complete search history.

(56) References Cited

U.S. PATENT DOCUMENTS

| | | | | |
|---|---|---|---|---|
| 5,591,280 | A * | 1/1997 | Asano | B60C 11/1263 152/DIG. 3 |
| 2002/0092591 | A1 * | 7/2002 | Cortes | B60C 11/0309 152/209.16 |
| 2005/0000613 | A1 * | 1/2005 | Maruoka | B60C 11/04 152/209.1 |
| 2011/0232815 | A1 | 9/2011 | Nakamizo et al. | |
| 2012/0006456 | A1 * | 1/2012 | Koshio | B60C 11/125 152/209.18 |
| 2012/0305155 | A1 * | 12/2012 | Hamanaka | B60C 11/1236 152/209.18 |
| 2014/0158261 | A1 * | 6/2014 | Takahashi | B60C 11/0306 152/209.1 |
| 2016/0059638 | A1 * | 3/2016 | Matsuda | B60C 11/0306 152/209.25 |
| 2018/0001708 | A1 | 1/2018 | Fujioka | |
| 2018/0001710 | A1 | 1/2018 | Fujioka | |
| 2019/0366775 | A1 | 12/2019 | Suzuki et al. | |

FOREIGN PATENT DOCUMENTS

| | | | | |
|---|---|---|---|---|
| DE | 11 2008 001 558 T5 | 7/2014 | | |
| EP | 0654366 A1 * | 5/1995 | ......... | B60C 11/0304 |
| EP | 3135504 A1 * | 3/2017 | ......... | B60C 11/0306 |
| EP | 3 176 006 A1 | 6/2017 | | |
| JP | H08-230418 A | 9/1996 | | |
| JP | 2005-289124 | 10/2005 | | |
| JP | 2008-307935 A | 12/2008 | | |
| JP | 4770797 B2 * | 9/2011 | ......... | B60C 11/0306 |
| JP | 6082368 | 2/2017 | | |
| JP | 6114722 | 4/2017 | | |
| JP | 6114723 | 4/2017 | | |
| JP | 2018-001933 | 1/2018 | | |
| JP | 2018-001941 A | 1/2018 | | |
| JP | 2018-111385 A | 7/2018 | | |
| JP | 6360587 | 7/2018 | | |
| JP | 2019137340 A * | 8/2019 | | |
| WO | WO 2010/061544 | 6/2010 | | |
| WO | WO-2018043553 A1 * | 3/2018 | ............. | B60C 11/03 |

* cited by examiner

| | CONVENTIONAL EXAMPLE | COMPARATIVE EXAMPLE 1 | COMPARATIVE EXAMPLE 2 | EXAMPLE 1 | EXAMPLE 2 | EXAMPLE 3 |
|---|---|---|---|---|---|---|
| NUMBER OF CIRCUMFERENTIAL MAIN GROOVES | 4 | 3 | 3 | 3 | 3 | 3 |
| GROOVE DEPTH DN OF NARROW SHALLOW GROOVE (NARROW GROOVE) TO GROOVE DEPTH DM OF CIRCUMFERENTIAL MAIN GROOVE | 0.2 | 0.08 | 0.65 | 0.3 | 0.3 | 0.3 |
| MINIMUM GROOVE WIDTH OF CENTER LUG GROOVE > MINIMUM GROOVE WIDTH OF SHOULDER LUG GROOVE? | POOR | GOOD | GOOD | GOOD | GOOD | GOOD |
| DOES NARROW SHALLOW GROOVE HAVE INCLINATION DIRECTION IDENTICAL TO THAT OF LUG GROOVE? | POOR | POOR | POOR | POOR | GOOD | GOOD |
| NUMBER OF BENT PORTIONS OF NARROW SHALLOW GROOVE | 2 | 2 | 2 | 2 | 2 | 3 |
| ARE NARROW SHALLOW GROOVES DISPOSED TO BE DISPLACED BETWEEN CENTER LAND PORTION AND SHOULDER LAND PORTION? | GOOD | GOOD | GOOD | GOOD | GOOD | GOOD |
| OPENING PORTION OF NARROW SHALLOW GROOVE IN SHOULDER LAND PORTION | BOTH ENDS | BOTH ENDS | BOTH ENDS | BOTH ENDS | BOTH ENDS | BOTH ENDS |
| LENGTH OF SHOULDER NARROW SHALLOW GROOVE TO WIDTH OF SHOULDER LAND PORTION | 100% | 100% | 100% | 100% | 100% | 100% |
| GROOVE DEPTH DC OF CENTER LUG TO GROOVE DEPTH DM OF CIRCUMFERENTIAL MAIN GROOVE | 0.7 | 0.7 | 0.7 | 0.7 | 0.7 | 0.7 |
| GROOVE DEPTH DS OF SHOULDER LUG TO GROOVE DEPTH DM OF CIRCUMFERENTIAL MAIN GROOVE | 0.7 | 0.7 | 0.7 | 0.7 | 0.7 | 0.7 |
| PRESENCE OF NARROW SHALLOW GROOVE NOTCH PORTION | YES | YES | YES | YES | YES | YES |
| GROOVE AREA RATIO BETWEEN SHOULDER MAIN GROOVES TO GROOVE AREA RATIO OUTER SIDE OF SHOULDER MAIN GROOVE | LESS THAN TWO TIMES | LESS THAN TWO TIMES | LESS THAN TWO TIMES | LESS THAN TWO TIMES | LESS THAN TWO TIMES | LESS THAN TWO TIMES |
| WIDTH OF CENTER LAND PORTION TO DEVELOPMENT WIDTH | 23% | 23% | 23% | 23% | 23% | 23% |
| WIDTH OF SHOULDER LAND PORTION TO DEVELOPMENT WIDTH | 23% | 23% | 23% | 23% | 23% | 23% |
| PERFORMANCE ON SNOW | 100 | 101 | 104 | 105 | 105 | 107 |
| UNEVEN WEAR RESISTANCE | 100 | 101 | 100 | 104 | 104 | 105 |

FIG. 15A

| | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|
| NUMBER OF CIRCUMFERENTIAL MAIN GROOVES | 3 | 3 | 3 | 3 | 3 | 3 | 3 |
| GROOVE DEPTH DN OF NARROW SHALLOW GROOVE (NARROW GROOVE) TO GROOVE DEPTH DM OF CIRCUMFERENTIAL MAIN GROOVE | 0.3 | 0.3 | 0.3 | 0.3 | 0.3 | 0.3 | 0.3 |
| MINIMUM GROOVE WIDTH OF CENTER LUG GROOVE > MINIMUM GROOVE WIDTH OF SHOULDER LUG GROOVE? | GOOD | GOOD | GOOD | GOOD | GOOD | GOOD | GOOD |
| DOES NARROW SHALLOW GROOVE HAVE INCLINATION DIRECTION IDENTICAL TO THAT OF LUG GROOVE? | GOOD | GOOD | GOOD | GOOD | GOOD | GOOD | GOOD |
| NUMBER OF BENT PORTIONS OF NARROW SHALLOW GROOVE | 10 | 11 | 8 | 8 | 8 | 8 | 8 |
| ARE NARROW SHALLOW GROOVES DISPOSED TO BE DISPLACED BETWEEN CENTER LAND PORTION AND SHOULDER LAND PORTION? | GOOD | GOOD | POOR | GOOD | GOOD | GOOD | GOOD |
| OPENING PORTION OF NARROW SHALLOW GROOVE IN SHOULDER LAND PORTION | BOTH ENDS | BOTH ENDS | BOTH ENDS | BOTH ENDS | BOTH ENDS | ONE END | ONE END |
| LENGTH OF SHOULDER NARROW SHALLOW GROOVE TO WIDTH OF SHOULDER LAND PORTION | 100% | 100% | 100% | 100% | 100% | 72% | 70% |
| GROOVE DEPTH DC OF CENTER LUG TO GROOVE DEPTH DM OF CIRCUMFERENTIAL MAIN GROOVE | 0.7 | 0.7 | 0.7 | 0.7 | 0.7 | 0.7 | 0.7 |
| GROOVE DEPTH DS OF SHOULDER LUG TO GROOVE DEPTH DM OF CIRCUMFERENTIAL MAIN GROOVE | 0.7 | 0.7 | 0.7 | 0.7 | 0.7 | 0.7 | 0.7 |
| PRESENCE OF NARROW SHALLOW GROOVE NOTCH PORTION | YES | YES | YES | YES | YES | YES | YES |
| GROOVE AREA RATIO BETWEEN SHOULDER MAIN GROOVES TO GROOVE AREA RATIO OUTER SIDE OF SHOULDER MAIN GROOVE | LESS THAN TWO TIMES | LESS THAN TWO TIMES | LESS THAN TWO TIMES | LESS THAN TWO TIMES | LESS THAN TWO TIMES | LESS THAN TWO TIMES | LESS THAN TWO TIMES |
| WIDTH OF CENTER LAND PORTION TO DEVELOPMENT WIDTH | 23% | 23% | 23% | 23% | 23% | 23% | 23% |
| WIDTH OF SHOULDER LAND PORTION TO DEVELOPMENT WIDTH | 23% | 23% | 23% | 23% | 23% | 23% | 23% |
| PERFORMANCE ON SNOW | 109 | 111 | 112 | 113 | 111 | 114 | 115 |
| UNEVEN WEAR RESISTANCE | 107 | 108 | 109 | 107 | 110 | 111 | 111 |

FIG. 15B

| | EXAMPLE 11 | EXAMPLE 12 | EXAMPLE 13 | EXAMPLE 14 | EXAMPLE 15 | EXAMPLE 16 | EXAMPLE 17 |
|---|---|---|---|---|---|---|---|
| NUMBER OF CIRCUMFERENTIAL MAIN GROOVES | 3 | 3 | 3 | 3 | 3 | 3 | 3 |
| GROOVE DEPTH DN OF NARROW SHALLOW GROOVE (NARROW GROOVE) TO GROOVE DEPTH DM OF CIRCUMFERENTIAL MAIN GROOVE | 0.3 | 0.3 | 0.3 | 0.3 | 0.3 | 0.3 | 0.3 |
| MINIMUM GROOVE WIDTH OF CENTER LUG GROOVE > MINIMUM GROOVE WIDTH OF SHOULDER LUG GROOVE? | GOOD | GOOD | GOOD | GOOD | GOOD | GOOD | GOOD |
| DOES NARROW SHALLOW GROOVE HAVE INCLINATION DIRECTION IDENTICAL TO THAT OF LUG GROOVE? | GOOD | GOOD | GOOD | GOOD | GOOD | GOOD | GOOD |
| NUMBER OF BENT PORTIONS OF NARROW SHALLOW GROOVE | 8 | 8 | 8 | 8 | 8 | 8 | 8 |
| ARE NARROW SHALLOW GROOVES DISPOSED TO BE DISPLACED BETWEEN CENTER LAND PORTION AND SHOULDER LAND PORTION? | GOOD | GOOD | GOOD | GOOD | GOOD | GOOD | GOOD |
| OPENING PORTION OF NARROW SHALLOW GROOVE IN SHOULDER LAND PORTION | ONE END | ONE END | ONE END | ONE END | ONE END | ONE END | ONE END |
| LENGTH OF SHOULDER NARROW SHALLOW GROOVE TO WIDTH OF SHOULDER LAND PORTION | 40% | 38% | 65% | 65% | 65% | 65% | 65% |
| GROOVE DEPTH DC OF CENTER LUG TO GROOVE DEPTH DM OF CIRCUMFERENTIAL MAIN GROOVE | 0.7 | 0.7 | 0.4 | 0.4 | 0.95 | 0.7 | 0.7 |
| GROOVE DEPTH DS OF SHOULDER LUG TO GROOVE DEPTH DM OF CIRCUMFERENTIAL MAIN GROOVE | 0.7 | 0.7 | 0.4 | 0.1 | 0.95 | 0.04 | 0.2 |
| PRESENCE OF NARROW SHALLOW GROOVE NOTCH PORTION | YES | YES | YES | YES | YES | YES | YES |
| GROOVE AREA RATIO BETWEEN SHOULDER MAIN GROOVES TO GROOVE AREA RATIO OUTER SIDE OF SHOULDER MAIN GROOVE | LESS THAN TWO TIMES | LESS THAN TWO TIMES | LESS THAN TWO TIMES | LESS THAN TWO TIMES | LESS THAN TWO TIMES | LESS THAN TWO TIMES | LESS THAN TWO TIMES |
| WIDTH OF CENTER LAND PORTION TO DEVELOPMENT WIDTH | 23% | 23% | 23% | 23% | 23% | 23% | 23% |
| WIDTH OF SHOULDER LAND PORTION TO DEVELOPMENT WIDTH | 23% | 23% | 23% | 23% | 23% | 23% | 23% |
| PERFORMANCE ON SNOW | 113 | 112 | 116 | 117 | 118 | 117 | 120 |
| UNEVEN WEAR RESISTANCE | 112 | 111 | 115 | 116 | 117 | 116 | 119 |

FIG. 15C

| | EXAMPLE 18 | EXAMPLE 19 | EXAMPLE 20 | EXAMPLE 21 | EXAMPLE 22 | EXAMPLE 23 |
|---|---|---|---|---|---|---|
| NUMBER OF CIRCUMFERENTIAL MAIN GROOVES | 3 | 3 | 3 | 3 | 3 | 3 |
| GROOVE DEPTH DN OF NARROW SHALLOW GROOVE (NARROW GROOVE) TO GROOVE DEPTH DM OF CIRCUMFERENTIAL MAIN GROOVE | 0.3 | 0.3 | 0.3 | 0.3 | 0.3 | 0.3 |
| MINIMUM GROOVE WIDTH OF CENTER LUG GROOVE > MINIMUM GROOVE WIDTH OF SHOULDER LUG GROOVE? | GOOD | GOOD | GOOD | GOOD | GOOD | GOOD |
| DOES NARROW SHALLOW GROOVE HAVE INCLINATION DIRECTION IDENTICAL TO THAT OF LUG GROOVE? | GOOD | GOOD | GOOD | GOOD | GOOD | GOOD |
| NUMBER OF BENT PORTIONS OF NARROW SHALLOW GROOVE | 8 | 8 | 8 | 8 | 8 | 8 |
| ARE NARROW SHALLOW GROOVES DISPOSED TO BE DISPLACED BETWEEN CENTER LAND PORTION AND SHOULDER LAND PORTION? | GOOD | GOOD | GOOD | GOOD | GOOD | GOOD |
| OPENING PORTION OF NARROW SHALLOW GROOVE IN SHOULDER LAND PORTION | ONE END | ONE END | ONE END | ONE END | ONE END | ONE END |
| LENGTH OF SHOULDER NARROW SHALLOW GROOVE TO WIDTH OF SHOULDER LAND PORTION | 65% | 65% | 65% | 65% | 65% | 65% |
| GROOVE DEPTH DC OF CENTER LUG TO GROOVE DEPTH DM OF CIRCUMFERENTIAL MAIN GROOVE | 0.7 | 0.7 | 0.7 | 0.7 | 0.7 | 0.7 |
| GROOVE DEPTH DS OF SHOULDER LUG TO GROOVE DEPTH DM OF CIRCUMFERENTIAL MAIN GROOVE | 0.1 | 0.1 | 0.1 | 0.1 | 0.1 | 0.1 |
| PRESENCE OF NARROW SHALLOW GROOVE NOTCH PORTION | NO | YES | YES | YES | YES | YES |
| GROOVE AREA RATIO BETWEEN SHOULDER MAIN GROOVES TO GROOVE AREA RATIO OUTER SIDE OF SHOULDER MAIN GROOVE | LESS THAN TWO TIMES | LESS THAN TWO TIMES | TWO TIMES OR MORE | TWO TIMES OR MORE | TWO TIMES OR MORE | TWO TIMES OR MORE |
| WIDTH OF CENTER LAND PORTION TO DEVELOPMENT WIDTH | 23% | 23% | 23% | 24% | 17% | 20% |
| WIDTH OF SHOULDER LAND PORTION TO DEVELOPMENT WIDTH | 23% | 23% | 23% | 19% | 26% | 23% |
| PERFORMANCE ON SNOW | 122 | 122 | 123 | 124 | 125 | 126 |
| UNEVEN WEAR RESISTANCE | 121 | 121 | 122 | 123 | 124 | 125 |

FIG. 15D

TIRE

RELATED APPLICATION

This application is based upon and claims the benefit of priority from Japanese Patent Application No. 2020-006288, filed Jan. 17, 2020, the entire contents of which is incorporated herein by reference.

TECHNICAL FIELD

The present technology relates to a tire.

BACKGROUND ART

In a tire mounted on a vehicle, a plurality of grooves and sipes are formed in a surface of a tread portion for the purpose of, for example, discharging water between a tread contact surface and a road surface during traveling on a wet road surface. Some conventional tires have improved various performances by devising a shape and arrangement of, for example, these grooves. For example, in pneumatic tires described in Japan Unexamined Patent Publication No. 2005-289124, Japan Patent Nos. 6114722, 6114723 and 6082368, and International Patent Publication No. WO 2010/061544, land portions are formed in blocks by main grooves and lateral grooves extending in a zigzag manner in a tire circumferential direction, and, for example, dimensions of the blocks and the grooves are specified, thus improving performance, such as uneven wear resistance and traction performance. Additionally, in pneumatic tires described in Japan Patent No. 6360587 and Japan Unexamined Patent Publication No. 2018-1933, formation of predetermined sipes in blocks disposed in a tread portion improves performance, such as wet performance.

Here, in recent years, there has been an increasing demand for performance on snow, which is running performance on snow-covered road surfaces, of a tire mounted on a trailer. To improve performance on snow, a technique that increases a groove volume and increases an amount of snow that can enter grooves to increase a so-called snow column shear force, which is a shear force acting on the snow in the grooves, is considered. However, the increase in groove volume relatively reduces a volume of land portions, so the rigidity of the land portions is likely to decrease. In particular, when the groove volume is increased in a block pattern, the rigidity of the blocks is likely to decrease remarkably. Accordingly, uneven wear caused by the decrease in the rigidity of the blocks is possibly likely to occur. Accordingly, improving performance on snow while suppressing the decrease in uneven wear resistance has been very difficult.

SUMMARY

The present technology provides a tire that allows improving performance on snow while suppressing a decrease in uneven wear resistance.

A tire according to an embodiment of the present technology includes three circumferential main grooves, lug grooves, and land portions. The three circumferential main grooves are disposed side by side in a tire width direction and extend in a tire circumferential direction. The lug grooves extend in the tire width direction. Each of the lug grooves have at least one end opening to the circumferential main groove. The land portions are defined by the circumferential main grooves and the lug grooves. Among the three circumferential main grooves, when the circumferential main groove disposed at a center in the tire width direction is defined as a center main groove and the circumferential main grooves disposed on both sides of the center main groove in the tire width direction are defined as shoulder main grooves, and among the land portions, when the land portions disposed on an inner side of the shoulder main grooves in the tire width direction are defined as center land portions and the land portions disposed on an outer side of the shoulder main grooves in the tire width direction are defined as shoulder land portions, narrow shallow grooves are formed in the center land portions and the shoulder land portions. Each of the narrow shallow grooves have at least one end opening to the circumferential main groove. The narrow shallow groove has a groove depth Dn within a range $0.1 \leq (Dn/Dm) \leq 0.4$ to a groove depth Dm of the circumferential main groove. The lug grooves include shoulder lug grooves and center lug grooves. The shoulder lug grooves are disposed on an outer side of the shoulder main groove in the tire width direction. Each of the shoulder lug grooves have one end opening to the shoulder main groove. The center lug grooves are disposed between the center main groove and the shoulder main groove. Each of the center lug grooves have both ends opening to the circumferential main grooves. The center lug groove has a minimum groove width wider than a minimum groove width of the shoulder lug groove.

Additionally, in the tire described above, an inclination direction of the narrow shallow grooves in the tire circumferential direction with respect to the tire width direction is preferably a direction identical to an inclination direction of the lug grooves in the tire circumferential direction with respect to the tire width direction. The lug grooves preferably define the land portion in which the narrow shallow grooves are formed.

Additionally, in the tire described above, the narrow shallow groove is preferably formed in a zigzag shape in which the narrow shallow groove bends at three or more locations while extending in the tire width direction.

Additionally, in the tire described above, the narrow shallow grooves formed in the center land portion and the shoulder land portion adjacent to one another via the shoulder main groove are preferably disposed to be displaced in the tire circumferential direction without having portions where positions in the tire circumferential direction become identical positions.

Additionally, in the tire described above, the narrow shallow groove formed in the center land portion preferably has both ends opening to the circumferential main grooves. The narrow shallow groove formed in the shoulder land portion preferably has one end opening to the circumferential main groove and another end terminating within the shoulder land portion.

Additionally, in the tire described above, the narrow shallow groove formed in the shoulder land portion has a length in the tire width direction within a range of from not less than 40% to not greater than 70% of a width of the shoulder land portion in the tire width direction.

Additionally, in the tire described above, the center lug groove preferably has a groove depth Dc within a range $0.50 \leq (Dc/Dm) \leq 0.90$ to a groove depth Dm of the circumferential main groove. The shoulder lug groove preferably has a groove depth Ds within a range $0.05 \leq (Ds/Dm) \leq 0.15$ to the groove depth Dm of the circumferential main groove.

Additionally, in the tire described above, the narrow shallow groove is preferably connected to a narrow shallow groove notch portion to open to the circumferential main groove via the narrow shallow groove notch portion. The narrow shallow groove is preferably a notch opening to the circumferential main groove. The narrow shallow groove notch portion is preferably formed to have a width that widens from the narrow shallow groove side to the circumferential main groove side.

Additionally, in the tire described above, a groove area ratio of a range between center lines of the shoulder main grooves on both sides in the tire width direction is preferably two times or more of a groove area ratio on an outer side in the tire width direction of the center line of the shoulder main groove.

Additionally, in the tire described above, the center land portion preferably has a width in the tire width direction within a range of from not less than 15% to not greater than 20% of a development width of a tread portion. The shoulder land portion preferably has a width in the tire width direction within a range of from not less than 20% to not greater than 25% of the development width.

Additionally, in the tire described above, in the narrow shallow groove, long portions and short portions are preferably alternately connected. Bent portions forming connecting portions between the long portions and the short portions are preferably within a range of from not less than 3 locations to not greater than 10 locations.

Additionally, in the tire described above, a cross-sectional area of the circumferential main groove in a cross-sectional view viewed in an extension direction of the circumferential main groove preferably satisfies a relationship (SL/SU)<0.5 between a cross-sectional area SL on a groove bottom side of the circumferential main groove and a cross-sectional area SU on a tread contact surface side demarcated by a position ½ of a groove depth of the circumferential main groove.

The tire according to an embodiment of the present technology exhibits an effect that allows improving performance on snow while suppressing a decrease in uneven wear resistance.

BRIEF DESCRIPTION OF DRAWINGS

FIGS. 15A-15D are tables showing results of performance evaluation tests of tires.

DETAILED DESCRIPTION

Tires according to embodiments of the present technology will be described in detail below with reference to the drawings. However, the present technology is not limited by the embodiments. Constituents of the following embodiments include elements that are essentially identical or that can be substituted and easily conceived by one skilled in the art.

Embodiments

In the following description, a description will be given using a pneumatic tire 1 as an example of the tire according to the embodiments of the present technology. The pneumatic tire 1 as an example of the tire can be filled with any gas including air and inert gas, such as nitrogen.

In the following description, "tire radial direction" refers to the direction orthogonal to a rotation axis (not illustrated) of the pneumatic tire 1. "Inner side in the tire radial direction" refers to the side toward the rotation axis in the tire radial direction. "Outer side in the tire radial direction" refers to the side away from the rotation axis in the tire radial direction. "Tire circumferential direction" refers to the circumferential direction with the rotation axis as the center axis. Additionally, "tire width direction" refers to the direction parallel with the rotation axis. "Inner side in the tire width direction" refers to the side toward a tire equatorial plane (tire equator line) CL in the tire width direction. "Outer side in the tire width direction" refers to the side away from the tire equatorial plane CL in the tire width direction. "Tire equatorial plane CL" refers to a plane that is orthogonal to the rotation axis of the pneumatic tire 1 and passes through the center of the tire width of the pneumatic tire 1. The tire equatorial plane CL matches the tire width direction center line, which is the center position of the pneumatic tire 1 in the tire width direction, in the position in the tire width direction. "Tire width" is the width in the tire width direction between portions located on the outermost in the tire width direction, or in other words, the distance between the portions that are the most distant from the tire equatorial plane CL in the tire width direction. "Tire equator line" refers to the line in the tire circumferential direction of the pneumatic tire 1 that lies on the tire equatorial plane CL.

Figure 1:
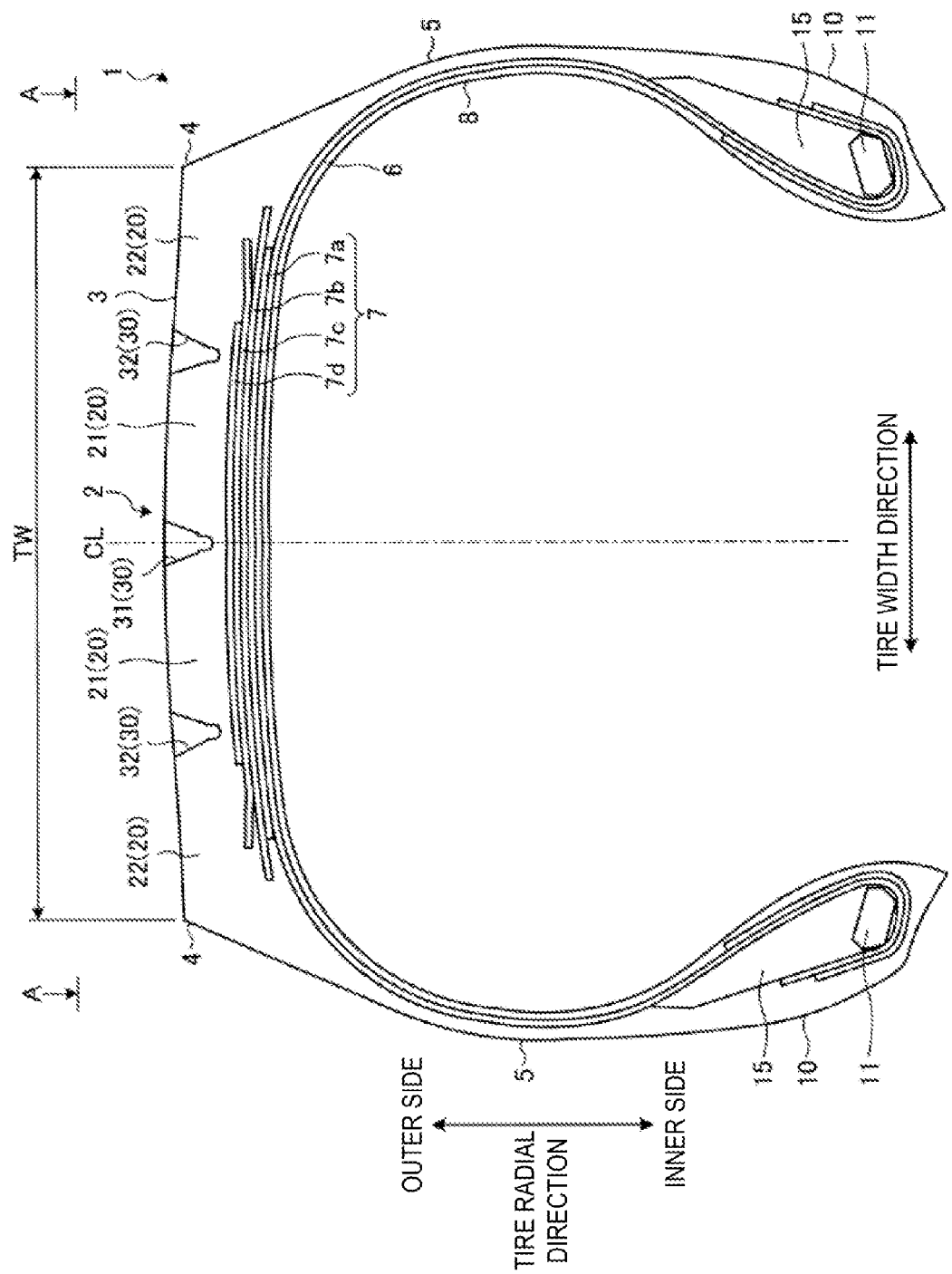
FIG. 1 is a meridian cross-sectional view illustrating a main portion of a pneumatic tire according to an embodiment.

FIG. 1 is a meridian cross-sectional view illustrating a main portion of the pneumatic tire 1 according to the embodiment. The pneumatic tire 1 according to the embodiment, as viewed in a tire meridian cross-section, is provided with a tread portion 2 outermost in the tire radial direction. The surface of the tread portion 2, i.e., the portion that comes into contact with a road surface while a vehicle (not illustrated) to which the pneumatic tires 1 are mounted travels, is formed as a tread contact surface 3. A plurality of circumferential main grooves 30 extending in the tire circumferential direction are formed in the tread contact surface 3. The plurality of circumferential main grooves 30 are disposed side by side in the tire width direction. In the present embodiment, the three circumferential main grooves 30 are disposed side by side in the tire width direction. Additionally, a plurality of land portions 20 are defined by the circumferential main grooves 30, which are disposed side by side in the tire width direction, in the tread contact surface 3. Note that the circumferential main groove 30 here is a longitudinal groove extending in the tire circumferential direction and internally having a wear indicator (slip sign) indicative of terminal stages of wear.

Both ends of the tread portion 2 in the tire width direction are formed as shoulder portions 4. Sidewall portions 5 are disposed from the shoulder portions 4 to predetermined positions on the inner side in the tire radial direction. In other words, the sidewall portions 5 are disposed at two positions on both sides of the pneumatic tire 1 in the tire width direction.

Furthermore, a bead portion 10 is disposed on the inner side of each sidewall portion 5 in the tire radial direction. The bead portions 10 are disposed at two positions on both sides of the tire equatorial plane CL similarly to the sidewall portions 5. In other words, a pair of the bead portions 10 are disposed on both sides of the tire equatorial plane CL in the tire width direction. Bead cores 11 are disposed in the pair of respective bead portions 10, and a bead filler 15 is disposed on an outer side of each bead core 11 in the tire radial direction. The bead core 11 is formed by winding a bead wire as a steel wire into a ring shape. The bead filler 15 is a rubber material disposed in a space formed by an end portion in the tire width direction of a carcass 6 described later being folded back on the outer side in the tire width direction at the position of the bead core 11.

A belt layer 7 is disposed on the inner side of the tread portion 2 in the tire radial direction. The belt layer 7 has a multilayer structure in which, for example, four layers of belts 7a, 7b, 7c, and 7d are layered and is formed by coating a plurality of belt cords made of a steel or an organic fiber material, such as polyester, rayon, or nylon, with a coating rubber and performing a rolling process on it. Furthermore, the belts 7a, 7b, 7c, and 7d have mutually different belt angles defined as inclination angles of the belt cords in the tire width direction with respect to the tire circumferential direction, and the belts 7a, 7b, 7c, and 7d are layered so that the inclination angles of the belt cords intersect with one another, i.e., a crossply structure.

The carcass 6 that includes a code of a radial ply is provided in a continuous manner on the inner side of the belt layer 7 in the tire radial direction and on the equatorial plane CL side of the sidewall portion 5. The carcass 6 has a single layer structure made of one carcass ply or a multilayer structure made of a plurality of layered carcass plies, and extends between the bead cores 11 disposed on both sides in the tire width direction in a toroidal shape, forming the backbone of the tire. Specifically, the carcass 6 is disposed from one bead portion 10 to the other bead portion 10 in the pair of bead portions 10 located on both sides in the tire width direction, and turned back on the outer side in the tire width direction along the bead cores 11 in the bead portions 10, wrapping around the bead cores 11 and the bead fillers 15. The carcass ply of the carcass 6 disposed in this manner is formed by coating a plurality of carcass cords made of a steel or an organic fiber material, such as polyester, rayon, or nylon, with a coating rubber and performing a rolling process on it.

Additionally, an innerliner 8 is formed along the carcass 6 on the inner side of the carcass 6 or on the inner side of the carcass 6 in the pneumatic tire 1.

Figure 2:
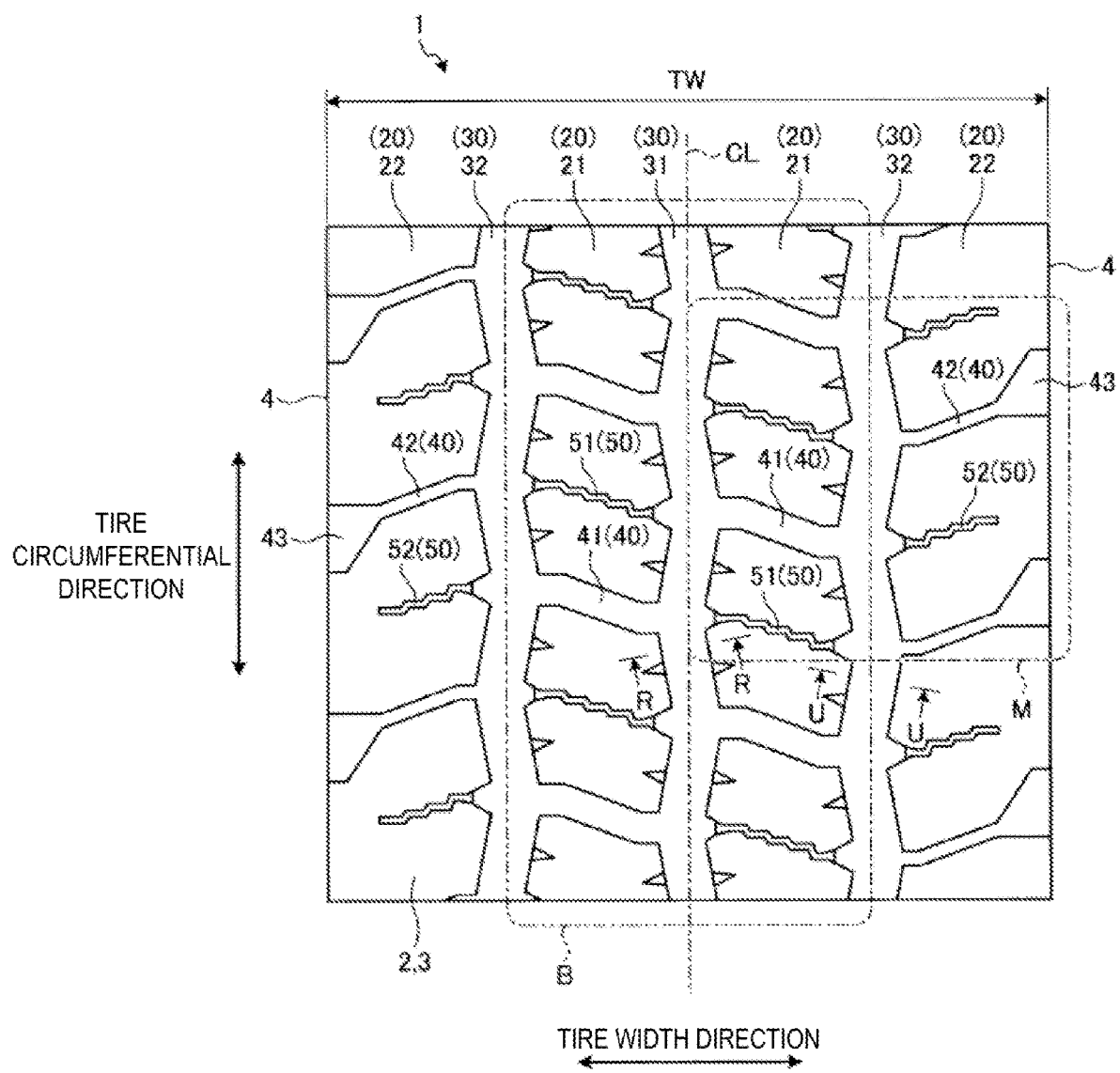
FIG. 2 is a view taken along line A-A of FIG. 1 in the direction of the arrows.

FIG. 2 is a view taken along line A-A of FIG. 1 in the direction of the arrows. The three circumferential main grooves 30 formed in the tread contact surface 3 include a center main groove 31 as the circumferential main groove 30 disposed at the center in the tire width direction and shoulder main grooves 32 as the circumferential main grooves 30 disposed on both sides of the center main groove 31 in the tire width direction. Of these, the center main groove 31 is disposed on the tire equatorial plane CL. Thus, the two shoulder main grooves 32, which are disposed on both sides of the center main groove 31 in the tire width direction, are disposed on both sides of the tire equatorial plane CL in the tire width direction. Additionally, both of the center main groove 31 and the shoulder main grooves 32 repeatedly bend in the tire width direction while extending in the tire circumferential direction. In other words, the center main groove 31 and the shoulder main grooves 32 amplify in the tire width direction while extending in the tire circumferential direction to form zigzag shapes.

The circumferential main grooves 30 have a groove width within the range of from not less than 10 mm to not greater than 25 mm and a groove depth within the range of from not less than 10 mm to not greater than 20 mm.

Additionally, in addition to the circumferential main grooves 30, a plurality of lug grooves 40 extending in the tire width direction and having at least one end opening to the circumferential main grooves 30 are formed in the tread contact surface 3. A plurality of land portions 20 are defined by the plurality of circumferential main grooves 30 and lug grooves 40 in the tread contact surface 3.

Of the plurality of lug grooves 40, the lug grooves 40 disposed between the center main groove 31 and the shoulder main groove 32 and having both ends opening to the circumferential main grooves 30 are center lug grooves 41. In other words, the center lug grooves 41 are formed by extending in the tire width direction and having both ends opening to the circumferential main grooves 30. Of the plurality of lug grooves 40, the lug grooves 40 disposed on the outer side of the shoulder main grooves 32 in the tire width direction and having one end opening to the shoulder main grooves 32 are shoulder lug grooves 42. The shoulder lug groove 42 is formed from the shoulder main groove 32 to an end portion (shoulder portion 4) of the tread portion 2 in the tire width direction.

Of these lug grooves 40, the center lug groove 41 has a substantially constant groove width. On the other hand, the shoulder lug groove 42 has a widened portion 43 with a widened groove width at a position at or near the end portion of the tread portion 2 in the tire width direction. The widened portion 43 has a groove width wider than that of a portion of the shoulder lug groove 42 opening to the shoulder main groove 32. The groove width of the portion of the shoulder lug groove 42 other than the widened portion 43 is narrower than the groove width of the center lug groove 41. In other words, the center lug groove 41 has the minimum groove width wider than the minimum groove width of the shoulder lug groove 42. Specifically, the minimum groove width of the center lug groove 41 is within the range of from not less than 5 mm to not greater than 13 mm, and the minimum groove width of the shoulder lug groove 42 is within the range of from not less than 3 mm to not greater than 7 mm.

Additionally, of the plurality of land portions 20, the land portions 20 disposed on the inner side of the shoulder main grooves 32 in the tire width direction are center land portions 21, and the land portions 20 disposed on the outer side of the shoulder main grooves 32 in the tire width direction are shoulder land portions 22. Specifically, the center land portion 21 is disposed between the center main groove 31 and the shoulder main groove 32, both sides in the tire width direction are defined by the center main groove 31 and the shoulder main grooves 32, and both sides in the tire circumferential direction are defined by the center lug grooves 41 adjacent in the tire circumferential direction. Additionally, the inner side of the shoulder land portion 22 in the tire width direction is defined by the shoulder main groove 32, the outer side in the tire width direction is defined by the end portion of the tread portion 2 in the tire width direction, and both sides in the tire circumferential direction are defined by the shoulder lug grooves 42 adjacent in the tire circumferential direction. Thus, the center land portion 21 and the shoulder land portion 22 are the so-called block-shaped land portions 20 in which both sides in the tire circumferential direction are defined by the lug grooves 40.

Additionally, narrow shallow grooves 50 extending in the tire width direction and having at least one end opening to the circumferential main groove 30 are formed in the land portion 20. Center narrow shallow grooves 51 as the narrow shallow grooves 50 are formed in the center land portion 21, and shoulder narrow shallow grooves 52 as the narrow shallow grooves 50 are formed in the shoulder land portion 22. Of these, the center narrow shallow grooves 51 are the narrow shallow grooves 50 extending in the tire width direction and having both ends opening to the circumferential main grooves 30. Additionally, the shoulder narrow shallow grooves 52 are the narrow shallow grooves 50 extending in the tire width direction, having one end opening to the shoulder main groove 32 and the other end terminating in the shoulder land portion 22.

One of the narrow shallow grooves 50 is disposed between the lug grooves 40 adjacent in the tire circumferential direction. In other words, one center narrow shallow groove 51 is disposed between the center lug grooves 41 adjacent in the tire circumferential direction, and one shoulder narrow shallow groove 52 is disposed between the shoulder lug grooves 42 adjacent in the tire circumferential direction. As such, the center lug grooves 41 and the center narrow shallow grooves 51 are disposed alternately in the tire circumferential direction, and the shoulder lug grooves 42 and the shoulder narrow shallow grooves 52 are disposed alternately in the tire circumferential direction. Additionally, the narrow shallow groove 50 has a groove width within the range of from not less than 1.0 mm to not greater than 3.0 mm. Each narrow shallow groove 50 bends at three or more locations while extending in the tire width direction, thus forming a zigzag shape. Note that the narrow shallow groove 50 preferably bends within the range of from not less than 3 locations to not greater than 10 locations.

Figure 3:
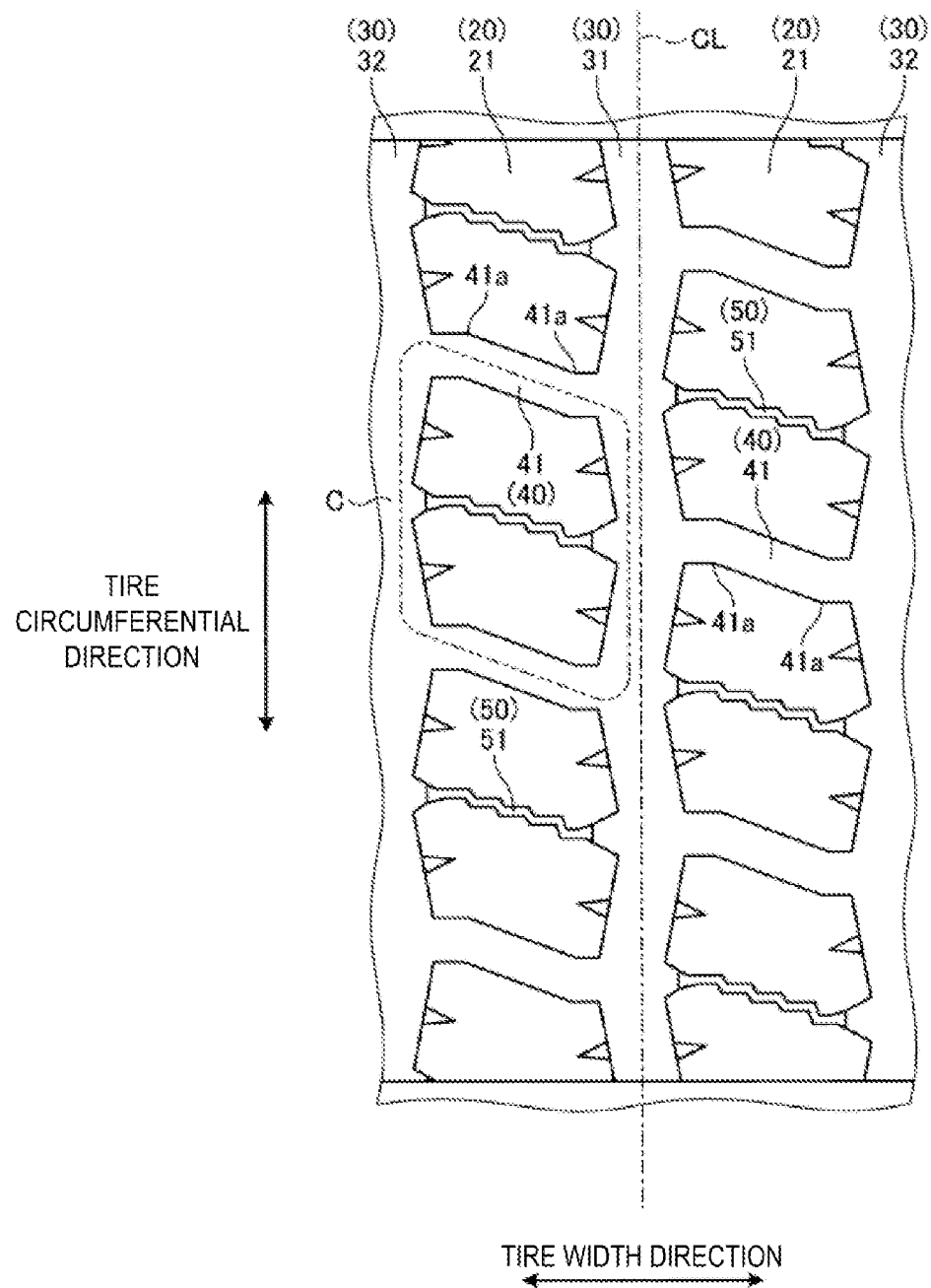
FIG. 3 is a detailed view of portion B of FIG. 2.

FIG. 3 is a detailed view of portion B of FIG. 2. The respective center lug grooves 41 disposed on both sides of the center main groove 31 in the tire width direction are disposed at positions where the positions in the tire circumferential direction differ from one another. In other words, the center lug grooves 41 are disposed offset from one another in the tire circumferential direction between the center lug grooves 41 disposed on both sides of the center main groove 31 in the tire width direction. Specifically, the center lug grooves 41 are each connected to a major angle side of the bend in the bent portion of the center main groove 31, which extends in the tire circumferential direction while repeatedly bending in the tire width direction. Thus, the center lug groove 41 extends on the outer side in the tire width direction from the bent position in the center main groove 31, which bends in the tire width direction, to a direction of forming a bent projection in the tire width direction. As a result, the center lug grooves 41 disposed on both sides of the center main groove 31 in the tire width direction are disposed alternately on both sides in the tire width direction in accordance with the direction of the bends of the plurality of bent portions of the center main groove 31, which repeatedly bends in the tire width direction while extending in the tire circumferential direction, when viewed along the tire circumferential direction.

Additionally, to the shoulder main groove 32, the center lug grooves 41 are each connected to the major angle side of the bend in the bent portion of the shoulder main groove 32, which extends in the tire circumferential direction while repeatedly bending in the tire width direction. Thus, the center lug groove 41 extends on the inner side in the tire width direction from the bent position in the shoulder main grooves 32, which bends in the tire width direction, to a direction of forming a bent projection in the tire width direction.

In this manner, the respective major angle sides and minor angle sides of the bent portions of the center main groove 31 and the shoulder main groove 32 to which the center lug grooves 41 are connected at the bent portions are formed at positions close to positions opposed to one another in the tire width direction. Specifically, the center main groove 31 and the shoulder main grooves 32 have pitches of the bends in the tire circumferential direction, that is, pitches of amplitude in the tire circumferential direction, with substantially identical sizes. Phases of the amplitude are slightly offset from one another in the tire circumferential direction from the positions where the mutual major angle sides and minor angle sides of the respective bent portions are opposed in the tire width direction. Additionally, between the shoulder main grooves 32 located on both sides of the center main groove 31 in the tire width direction, the directions in which the phases of the amplitude are shifted in the tire circumferential direction with respect to the center main groove 31 are in the opposite directions to one another in the tire circumferential direction.

Because the phase of the amplitude of the center main groove 31 and the phase of the amplitude of the shoulder main groove 32 are offset in the tire circumferential direction, the center lug grooves 41 having one end connected to the major angle sides of the bends of the center main groove 31 and the other end connected to the major angle sides of the bends of the shoulder main groove 32 are inclined in the tire circumferential direction with respect to the tire width direction while extending in the tire width direction. Additionally, the shoulder main grooves 32 on both sides of the center main groove 31 in the tire width direction are opposite to one another in the direction in which the phases of the amplitude are shifted to the center main groove 31. Accordingly, the direction of inclination of the center lug grooves 41 in the tire circumferential direction with respect to the tire width direction is the identical direction between the center lug grooves 41 disposed on both sides of the center main groove 31 in the tire width direction.

Specifically, the center lug groove 41 has bent portions 41a at two locations near both ends in the tire width direction, and the center lug groove 41 is formed to be inclined in the tire circumferential direction with respect to the tire width direction between the bent portions 41a. On the other hand, the center lug groove 41 is formed extending almost in the tire width direction between the bent portion 41a and the end portion of the center lug groove 41. In other words, a portion between the bent portion 41a near the center main groove 31 and the center main groove 31 and a portion between the bent portion 41a near the shoulder main groove 32 and the shoulder main groove 32 in the center lug groove 41 are formed to extend substantially in the tire width direction.

Additionally, in the center land portions 21, in accordance with the center lug grooves 41 being disposed offset from one another on both sides of the center main groove 31 in the tire width direction, the center land portions 21 disposed on both sides of the center main groove 31 in the tire width direction are also disposed offset from one another in the tire circumferential direction. As a result, the position where the center narrow shallow groove 51 formed in the center land portion 21 opens to the center main groove 31 and the position where the center lug groove 41 located on the opposite side with respect to the center main groove 31 opens to the identical center main groove 31 are substantially identical positions in the positions in the tire circumferential direction.

Specifically, the center narrow shallow groove 51 formed in the center land portion 21 has both ends opening to the circumferential main grooves 30. To the center main groove 31, the center narrow shallow groove 51 is connected to the minor angle side of the bend in the bent portion of the center main groove 31. In other words, the center narrow shallow groove 51 is connected to the center main groove 31 on the minor angle side of the bend in the center main groove 31, in contrast to the center lug groove 41 being connected to the center main groove 31 on the major angle side of the bend in the bent portion of the center main groove 31. Accordingly, both of the center lug groove 41 and the center narrow shallow groove 51 opening to the center main groove 31 open to the zigzag bent portions in the center main groove 31. The center lug groove 41 and the center narrow shallow groove 51 connected to the bent portions of the identical center main groove 31 open at the positions opposed to one another in the groove width direction of the center main groove 31.

Additionally, the center narrow shallow groove 51 having both ends opening to the circumferential main grooves 30 is connected to the shoulder main groove 32 on the minor angle side of the bend in the bent portion of the shoulder main groove 32. Accordingly, the center narrow shallow grooves 51 are formed substantially parallel to the center lug grooves 41, which define both sides of the center land portion 21 in the tire circumferential direction. In other words, the center narrow shallow grooves 51 are formed to be inclined in the tire circumferential direction with respect to the tire width direction. The inclination direction in the tire circumferential direction with respect to the tire width direction is the direction identical to the inclination direction of the center lug grooves 41, which define the center land portion 21 in which the center narrow shallow grooves 51 are formed, in the tire circumferential direction with respect to the tire width direction.

Figure 4:
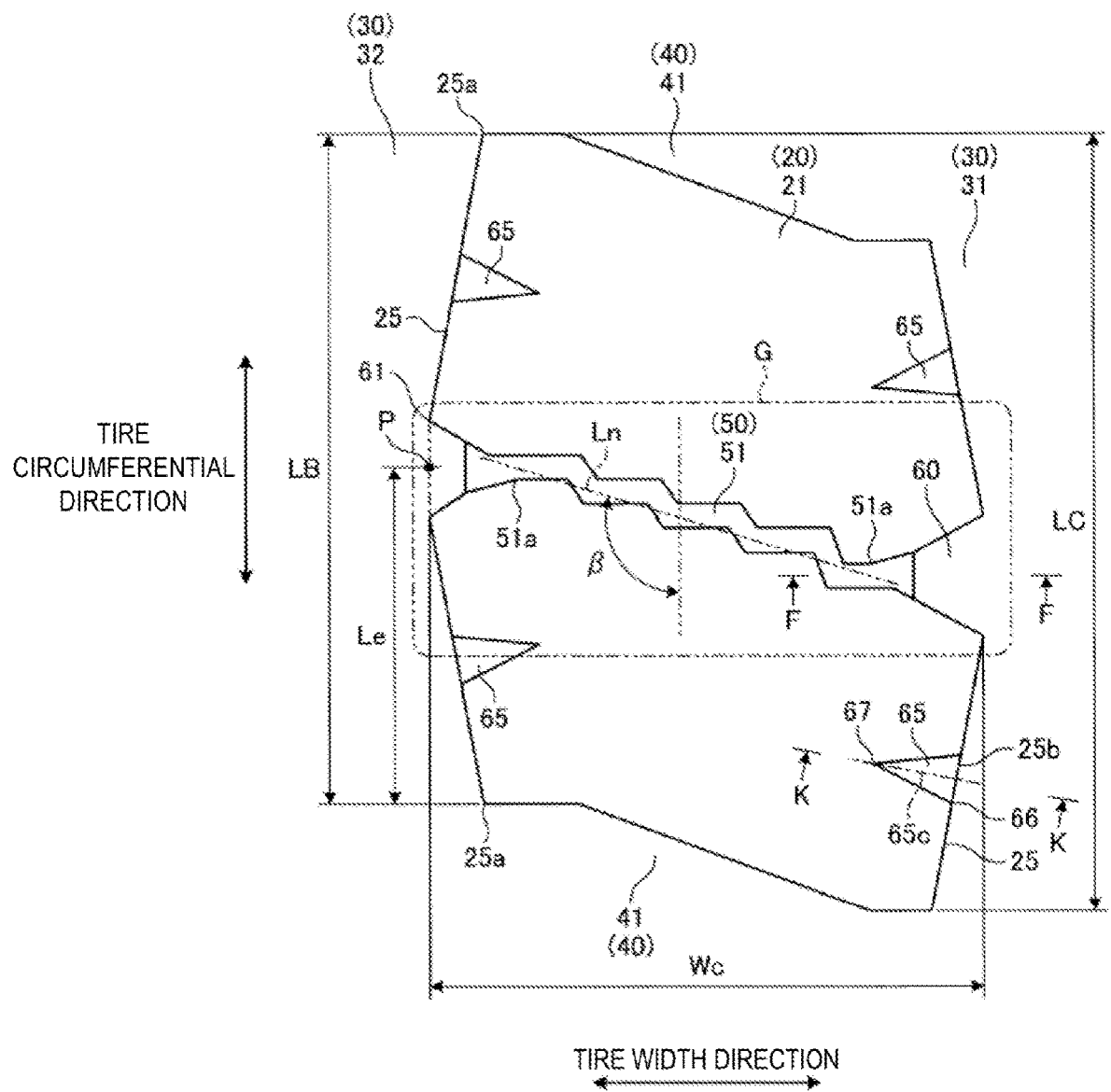
FIG. 4 is a detailed view of portion C of FIG. 3.

FIG. 4 is a detailed view of portion C of FIG. 3. The narrow shallow groove 50 is connected to a narrow shallow groove notch portion 60, which is a notch opening to the circumferential main groove 30, to open to the circumferential main groove 30 via the narrow shallow groove notch portion 60. In other words, the narrow shallow groove notch portion 60 opening to the circumferential main groove 30 is formed at and near the end portion of the narrow shallow groove 50 in the tire width direction in the land portion 20. The narrow shallow groove 50 is connected to the narrow shallow groove notch portion 60 from the side opposite to the side where the narrow shallow groove notch portion 60 opens to the circumferential main groove 30 in the tire width direction. As a result, the narrow shallow groove 50 opens to the circumferential main groove 30 via the narrow shallow groove notch portion 60, which opens to the circumferential main groove 30.

For example, the narrow shallow groove notch portion 60 opening to the center main groove 31 is formed at and near the end portion on the center main groove 31 side in the tire width direction of the center narrow shallow groove 51, and the narrow shallow groove notch portion 60 opening to the shoulder main groove 32 is formed at and near the end portion on the shoulder main groove 32 side in the tire width direction in the center land portion 21. To the center main groove 31, the center narrow shallow groove 51 is connected to the narrow shallow groove notch portion 60 from the side in the tire width direction opposite to the side where the narrow shallow groove notch portion 60, opening to the center main groove 31, opens to the center main groove 31, and thus the center narrow shallow groove 51 opens to the center main groove 31 via the narrow shallow groove notch portion 60. Similarly, to the shoulder main groove 32, the center narrow shallow groove 51 is connected to the narrow shallow groove notch portion 60 from the side in the tire width direction opposite to the side where the narrow shallow groove notch portion 60, opening to the shoulder main groove 32, opens to the shoulder main groove 32, and thus the center narrow shallow groove 51 opens to the shoulder main groove 32 via the narrow shallow groove notch portion 60.

The narrow shallow groove notch portion 60 formed in this manner has a groove width wider than that of the narrow shallow groove 50 for the most part, and the width of the narrow shallow groove notch portion 60 widens from the narrow shallow groove 50 side to the circumferential main groove 30 side. In other words, the narrow shallow groove notch portion 60 has the width in the groove width direction of the narrow shallow groove 50 or in the tire circumferential direction to the extent similar to that of the narrow shallow groove 50 at and near the end portion on the side to which the narrow shallow grooves 50 is connected in the tire width direction, and the width in the groove width direction of the narrow shallow groove 50 or in the tire circumferential direction widens to the side where the circumferential main groove 30 is located.

In the narrow shallow groove notch portion 60, a relationship between a length LB of an edge 25 of the land portion 20 in the tire circumferential direction and a length Le from a position of a width center P of an opening portion 61 of the narrow shallow groove notch portion 60 to an end portion 25a in the tire circumferential direction of the edge 25 in the tire circumferential direction is within the range $0.3 \leq (Le/LB) \leq 0.7$.

In this case, the edge 25 of the land portion 20 is the edge 25 formed by the circumferential main groove 30 to which the narrow shallow groove notch portion 60 opens in the land portion 20. In other words, in the narrow shallow groove notch portion 60 on the center main groove 31 side, the target edge 25 is the edge 25 formed by the center main groove 31 as the circumferential main groove 30 to which the narrow shallow groove notch portion 60 on the center main groove 31 side opens in the center land portion 21. Similarly, in the narrow shallow groove notch portion 60 on the shoulder main groove 32 side, the target edge 25 is the edge 25 formed by the shoulder main groove 32 as the circumferential main groove 30 to which the narrow shallow groove notch portion 60 on the shoulder main groove 32 side opens in the center land portion 21. Additionally, the position of the width center P of the opening portion 61 of the narrow shallow groove notch portion 60 is the position of the width center P of the opening portion 61 with respect to the circumferential main groove 30 in the narrow shallow groove notch portion 60.

The center narrow shallow groove 51 formed in the center land portion 21 has an angle β of a straight line Ln, which is formed by connecting end portions 51a on both sides in the length direction, with respect to the tire circumferential direction within the range $60° \leq \beta \leq 120°$. The straight line Ln in this case is the imaginary straight line Ln connecting the groove width centers of the end portions 51a on both sides in the length direction of the center narrow shallow groove 51. The center narrow shallow groove 51 formed to be inclined in the tire circumferential direction with respect to the tire width direction has the inclination angle β of the straight line Ln in the tire width direction with respect to the tire circumferential direction within the range 60°≤β≤120°.

Figure 5:
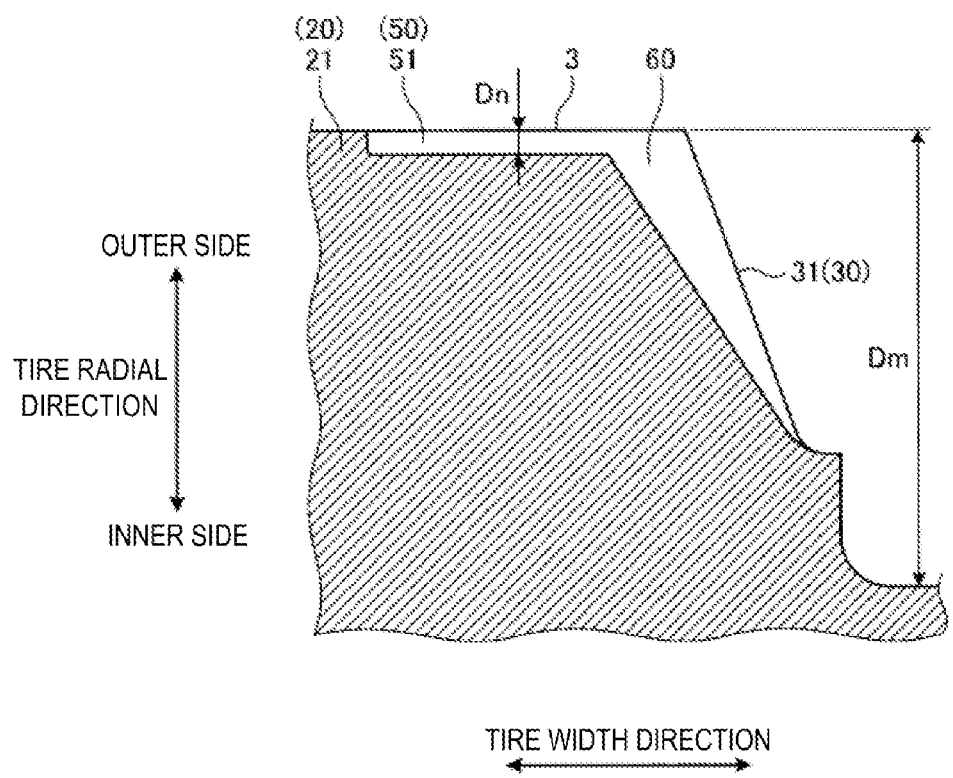
FIG. 5 is a cross-sectional view taken along F-F of FIG. 4.

FIG. 5 is a cross-sectional view taken along F-F of FIG. 4. The center narrow shallow groove 51 has a groove depth Dn within the range of from not less than 1.0 mm to not greater than 3.0 mm. Additionally, the groove depth Dn of the center narrow shallow groove 51 is substantially shallower than a groove depth Dm of the circumferential main groove 30, and the groove depth Dn of the center narrow shallow groove 51 is within the range 0.1≤(Dn/Dm)≤0.4 to the groove depth Dm of the circumferential main groove 30.

Additionally, the narrow shallow groove notch portion 60 is formed so as to deepen the depth from the narrow shallow groove 50 side to the circumferential main groove 30 side. That is, the narrow shallow groove notch portion 60 has the depth from the tread contact surface 3 to the extent similar to that of the narrow shallow groove 50 at or near the end portion on the side to which the narrow shallow groove 50 is connected in the tire width direction, and the depth from the tread contact surface 3 deepens to the side where the circumferential main groove 30 is located.

Figure 6:
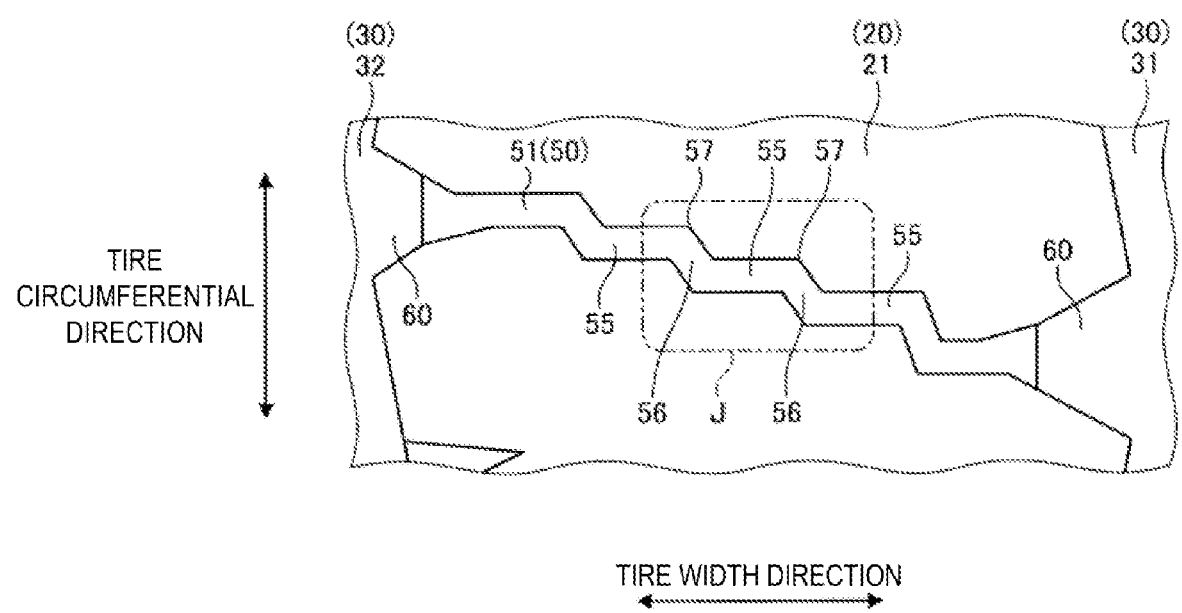
FIG. 6 is a detailed view of portion G of FIG. 4.

FIG. 6 is a detailed view of portion G of FIG. 4. The center narrow shallow groove 51 has a respective plurality of long portions 55 and short portions 56 formed with mutually different lengths. By connecting the long portions 55 and the short portions 56 in alternation, the center narrow shallow groove 51 bends while extending in the tire width direction to form a zigzag shape. The relative lengths of the long portion 55 and the short portion 56 differ from one another, and the length of the long portion 55 is longer than the length of the short portion 56. Furthermore, the long portion 55 and the short portion 56 are disposed with mutually different extension directions. The long portions 55 and the short portions 56 that mutually differ in the length and mutually differ in the extension direction are connected in alternation in the center narrow shallow groove 51. Accordingly, in the center narrow shallow groove 51, a connecting portion between the long portion 55 and the short portion 56 becomes a bent portion 57. The center narrow shallow groove 51 has a plurality of the bent portions 57, which form the connecting portions between the long portions 55 and the short portions 56, within the range of from not less than 3 locations to not greater than 10 locations, and thus the center narrow shallow groove 51 has the zigzag shape bending at the bent portions 57.

In the present embodiment, the long portion 55 extends in the tire width direction and the short portion 56 is inclined in the tire width direction with respect to the tire circumferential direction while extending in the tire circumferential direction. Also, the two short portions 56 connected to both ends of one long portion 55 have directions extending from the long portion 55 in the tire circumferential direction opposite from one another. In other words, the two long portions 55 connected to both ends of one short portion 56 have directions extending from the short portion 56 in the tire width direction opposite from one another. As a result, the center narrow shallow groove 51 is formed to be inclined in the tire circumferential direction with respect to the tire width direction while extending in the tire width direction as a whole. Note that in the present embodiment, the long portions 55 are disposed at both ends in the length direction of the center narrow shallow groove 51. The long portions 55 located at both ends in the length direction of the center narrow shallow groove 51 are connected to the narrow shallow groove notch portions 60 to which the center narrow shallow groove 51 is connected.

Figure 7:
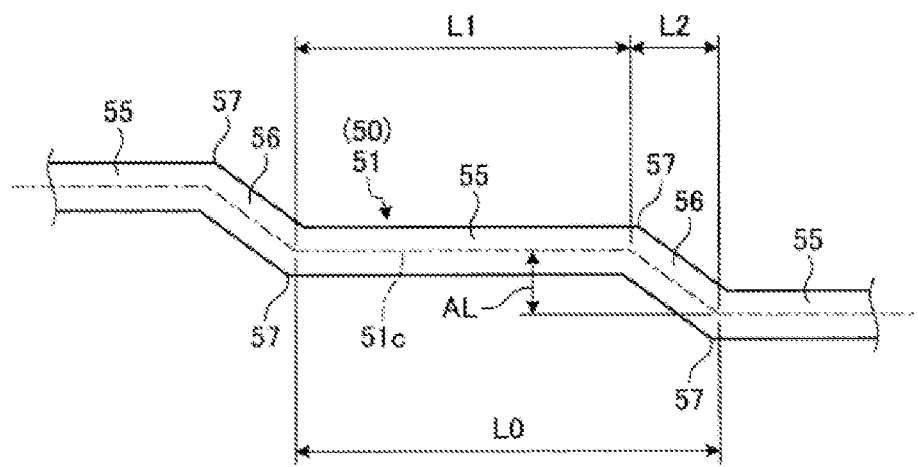
FIG. 7 is a detailed view of portion J of FIG. 6.

FIG. 7 is a detailed view of portion J of FIG. 6. The center narrow shallow groove 51 has a relationship between a length L1 of the long portion 55 in the tire width direction and a length L0 as an addition of the long portion 55 and the short portion 56 connected to one another in the tire width direction within the range 0.5<(L1/L0)≤0.9. In this case, the length L0, which is the addition of the long portion 55 and the short portion 56 in the tire width direction, becomes the length of an addition of the length L1 of the long portion 55 in the tire width direction and a length L2 of the short portion 56 connected to the long portion 55 in the tire width direction, and becomes the length calculated by L0=L1+L2.

Additionally, both of the length L1 of the long portion 55 in the tire width direction and the length L2 of the short portions 56 in the tire width direction are a length of a center line 51c of the groove width of the center narrow shallow groove 51. That is, both of the length L1 of the long portion 55 in the tire width direction and the length L2 of the short portion 56 in the tire width direction are the lengths in the tire width direction of the portions where the center lines 51c of the groove widths of the long portions 55 intersect with the center lines 51c of the groove widths of the short portions 56.

The value calculated by (L1/L0) of the plurality of long portions 55 and short portions 56 provided with the center narrow shallow groove 51 has a constant size. In other words, in the center narrow shallow groove 51, the lengths L1 of the respective plurality of long portions 55 have the constant size, and the lengths L2 of the respective plurality of short portions 56 have the constant size. Accordingly, the value calculated by (L1/L0) is the constant size in the center narrow shallow groove 51.

Note that, of the plurality of long portions 55 provided with the center narrow shallow groove 51, the long portions 55 disposed at both ends of the center narrow shallow groove 51 in the length direction and connected to the narrow shallow groove notch portions 60 differ from the other long portions 55 in the length L1 in the tire width direction. As a result, the value of (L1/L0) related to the long portions 55 located at both ends of the center narrow shallow groove 51 also differs from the value of (L1/L0) related to the long portions 55 other than both ends of the center narrow shallow groove 51. Thus, in the center narrow shallow groove 51, the value calculated by (L1/L0) of the long portions 55 and the short portions 56 other than the long portions 55 at both ends in the length direction is the constant size. Specifically, in the center narrow shallow groove 51, among the values calculated by (L1/L0) of the long portions 55 and the short portions 56 other than the long portions 55 at both ends in the length direction, the smallest value is within the range of from not less than 10% to not greater than 100% to the largest value.

Additionally, in the center narrow shallow groove 51, an offset amount AL between the long portions 55 adjacent via the short portion 56 is within the range 1.0 mm≤Al≤3.0 mm. In other words, in the present embodiment, since the long portions 55 of the center narrow shallow groove 51 are formed extending in the tire width direction, the offset amount AL between the long portions 55 adjacent via the short portion 56 is a distance between the long portions 55 adjacent via the short portion 56 in the tire circumferential direction. In addition, the offset amount AL between the long portions 55 in this case is, for example, the offset amount AL between the center lines 51c of both long portions 55. Additionally, the plurality of long portions 55 provided with the center narrow shallow groove 51 have the offset amount AL between the long portions 55 adjacent via the short portion 56 with the constant size. Specifically, in the center narrow shallow groove 51, the minimum value of the offset amount AL between the long portions 55 adjacent via the short portions 56 is within the range of from 10% to 100% to the maximum value of the offset amount AL.

Additionally, in the center narrow shallow groove 51, the offset amount AL between the long portions 55 adjacent via the short portion 56 is within the range $0.01 \leq (AL/LC) \leq 0.05$ to a length LC (see FIG. 4) of the center land portion 21, which is the land portion 20 in which the center narrow shallow groove 51 is formed, in the tire circumferential direction.

Additionally, the center land portion 21 includes a plurality of auxiliary notch portions 65 (see FIG. 4) as notches opening to the circumferential main grooves 30. The auxiliary notch portions 65 include the auxiliary notch portion 65 opening to the center main groove 31 on the edge 25 side formed by the center main groove 31 and the auxiliary notch portion 65 opening to the shoulder main groove 32 on the edge 25 side formed by the shoulder main groove 32 in the center land portion 21.

Additionally, the auxiliary notch portions 65 are formed on both sides of the center narrow shallow groove 51 in the tire circumferential direction on the edges 25 formed by the circumferential main grooves 30 in the center land portion 21. Thus, as the auxiliary notch portions 65 formed in one center land portion 21, the two auxiliary notch portions 65 are formed in each edge 25 on both sides in the tire width direction, and a total of the four auxiliary notch portions 65 are formed in one center land portion 21. The auxiliary notch portions 65 are each disposed at or near the center between the opening portion of the center lug groove 41, which defines the end portion of the center land portion 21 in the tire circumferential direction, to the circumferential main groove 30 and the opening portion of the center narrow shallow groove 51 to the circumferential main groove 30.

Thus, the auxiliary notch portion 65, which is formed in the center land portion 21, is formed to have the width that narrows from an opening portion 66 side in the auxiliary notch portion 65 opening to the circumferential main groove 30 to an end portion 67 side located on the side opposite to the opening portion 66 in the auxiliary notch portion 65. In other words, the auxiliary notch portion 65 is formed in a substantially triangular shape whose width increases from the end portion 67 side to the opening portion 66 side in plan view.

Additionally, the auxiliary notch portion 65 is formed in a direction vertically notched with respect to the edge 25 formed by the circumferential main groove 30 in the center land portion 21. Specifically, the auxiliary notch portion 65 is formed to have a shape such that a perpendicular line 65c that passes through the end portion 67 of the auxiliary notch portion 65 and is orthogonal to a straight line 25b along the edge 25 of the center land portion 21 passes through the opening portion 66 of the auxiliary notch portion 65. In this case, the edge 25 of the center land portion 21 is the edge 25 formed by the circumferential main groove 30 to which the auxiliary notch portion 65 opens in the center land portion 21, and the straight line 25b is an imaginary straight line extending along the edge 25 inside the opening portion 66 of the auxiliary notch portion 65.

Thus, all of the four auxiliary notch portions 65 formed in one center land portion 21 are formed to have the shape such that the perpendicular lines 65c that pass through the end portions 67 of the auxiliary notch portions 65 and are orthogonal to the straight lines 25b along the edges 25 of the center land portion 21 pass through the opening portions 66. Since the center main groove 31, which forms the edge 25 of the center land portion 21, has the zigzag shape in which the center main groove 31 amplifies in the tire width direction while extending in the tire circumferential direction, all of the portions where the four auxiliary notch portions 65 open in the edges 25 of the center land portion 21 have the extension directions in different directions. As a result, the four auxiliary notch portions 65 formed in the direction vertically notched with respect to the edges 25 of the center land portion 21 have the notched directions different from one another.

Figure 8:
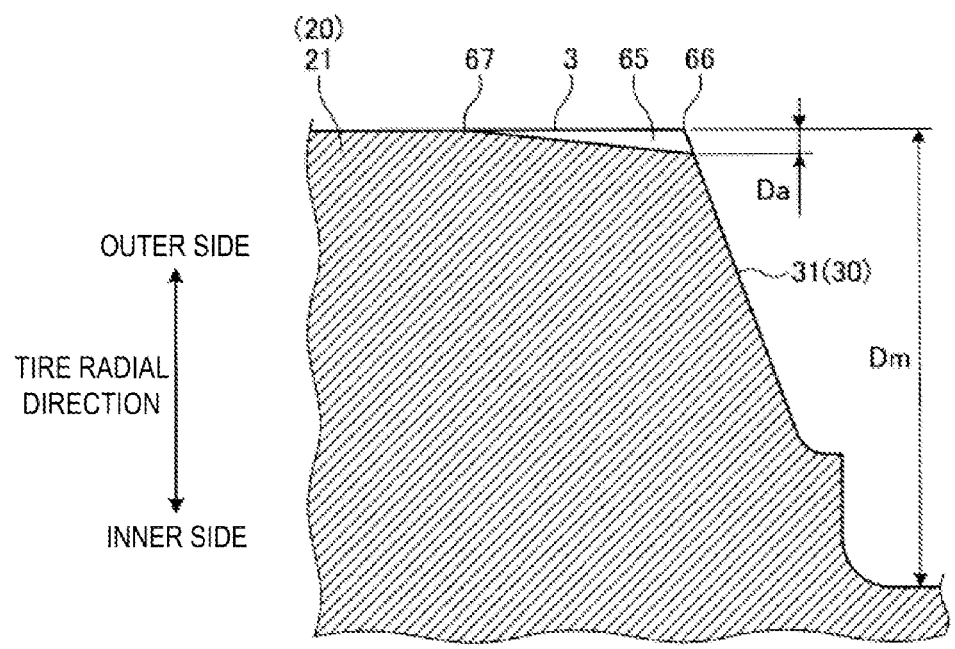
FIG. 8 is a cross-sectional view taken along K-K of FIG. 4.

FIG. 8 is a cross-sectional view taken along K-K of FIG. 4. The auxiliary notch portion 65 has the depth from the tread contact surface 3 formed to deepen from the end portion 67 side to the opening portion 66 side. In other words, the auxiliary notch portion 65 is formed so as to deepen the depth and widen the width from the end portion 67 side to the opening portion 66 side. Thus, the auxiliary notch portion 65 formed to change the depth from the tread contact surface 3 has a maximum depth Da within the range of from not less than 2 mm to not greater than 5 mm. The maximum depth Da of the auxiliary notch portion 65 is within the range $0.1 \leq (Da/Dm) \leq 0.4$ to the groove depth Dm of the circumferential main groove 30.

The center land portion 21, which is defined on both sides in the tire width direction by the center main groove 31 and the shoulder main groove 32 and defined on both sides in the tire circumferential direction by the center lug grooves 41, has a width Wc (see FIG. 4) in the tire width direction within the range of from not less than 15% to not greater than 20% of a development width TW (see FIG. 2) of the tread portion 2. In this case, the width Wc of the center land portion 21 in the tire width direction is the maximum width of the center land portion 21 in the tire width direction in which the center narrow shallow grooves 51 are formed.

Note that the development width TW of the tread portion 2 refers to a linear distance in the tire width direction between the end portions on the outer side in the tire width direction of the tread contact surface 3 in the two shoulder land portions 22 located on both sides in the tire width direction when the pneumatic tire 1 is mounted on a regular rim, inflated to a regular internal pressure, and in an unloaded state. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to the "maximum air pressure" defined by JATMA, the maximum value described in "TIRE LOAD LIMITS AT VARIOUS COLD INFLATION PRESSURES" defined by TRA, or "INFLATION PRESSURES" defined by ETRTO.

Figure 9:
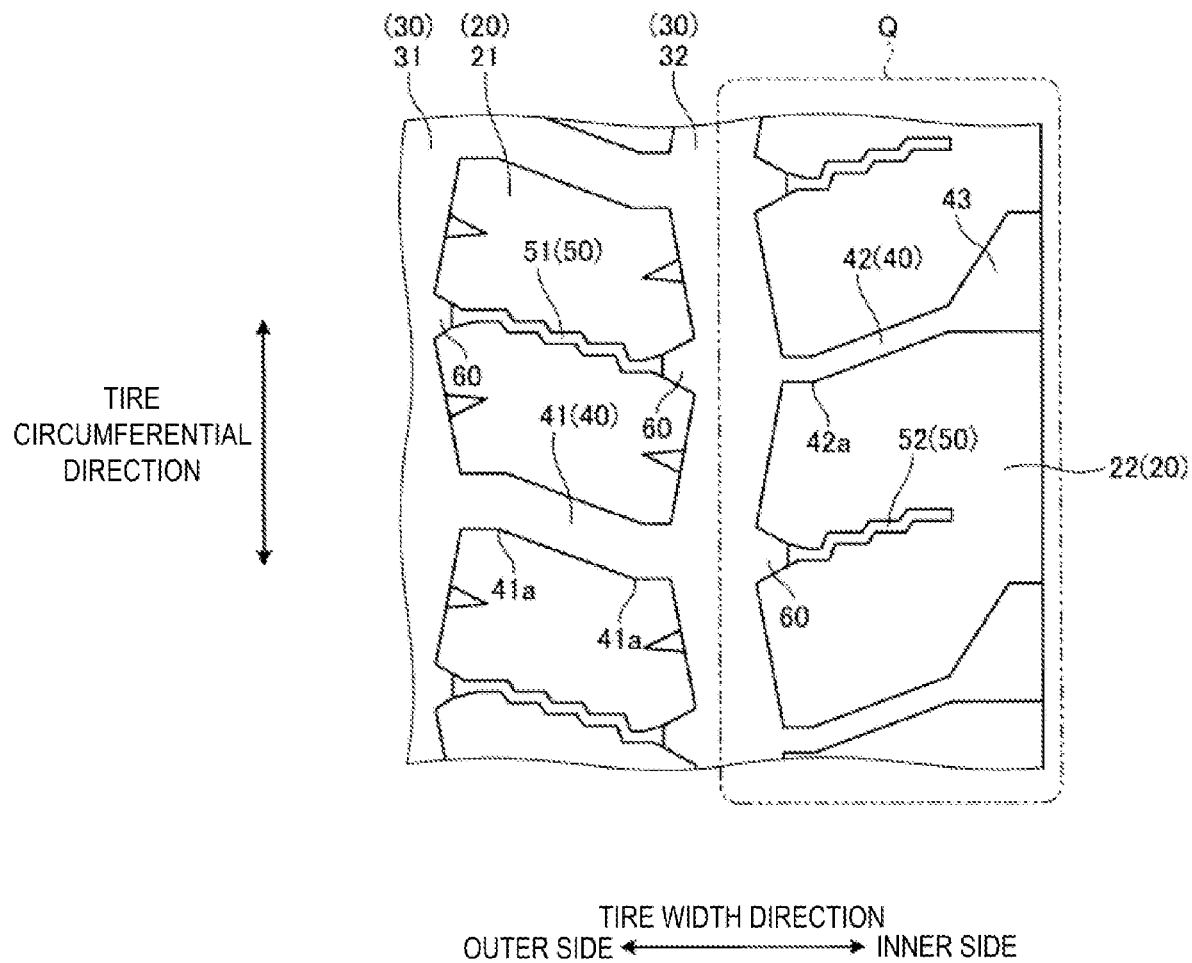
FIG. 9 is a detailed view of portion M of FIG. 2.

FIG. 9 is a detailed view of portion M of FIG. 2. The shoulder narrow shallow groove 52, which is the narrow shallow groove 50 formed in the shoulder land portion 22, has one end that opens to the circumferential main groove 30 and the other end that terminates within the shoulder land portion 22. Specifically, the shoulder narrow shallow groove 52 formed in the shoulder land portion 22 has an end portion on the inner side in the tire width direction opening to the shoulder main groove 32 and connected to the minor angle side of the bend in the bent portion of the shoulder main groove 32.

On the other hand, the center lug groove 41 connected to the shoulder main groove 32 from the side opposite to the side to which the shoulder narrow shallow groove 52 is connected in the groove width direction of the shoulder main groove 32 is connected to the shoulder main groove 32 on the major angle side of the bend in the bent portion of the shoulder main groove 32. Accordingly, both of the center lug groove 41 and the shoulder narrow shallow groove 52 opening to the shoulder main groove 32 open to the zigzag bent portions in the shoulder main groove 32. The center lug groove 41 and the shoulder narrow shallow groove 52 connected to the bent portions of the identical shoulder main groove 32 open at the positions opposed to one another in the groove width direction of the shoulder main groove 32.

Additionally, the shoulder lug grooves 42, which define the end portions of the shoulder land portion 22 in the tire circumferential direction, have the end portions on the inner side in the tire width direction connected to the major angle sides of the bends in the bent portions of the shoulder main groove 32. The center narrow shallow groove 51 connected to the shoulder main groove 32 from the side opposite to the side to which the shoulder lug groove 42 is connected in the groove width direction of the shoulder main groove 32 is connected to the shoulder main groove 32 on the minor angle side of the bend in the bent portion of the shoulder main groove 32. Accordingly, both of the shoulder lug groove 42 and the center narrow shallow groove 51 opening to the shoulder main groove 32 open to the zigzag bent portions in the shoulder main groove 32. The shoulder lug groove 42 and the center narrow shallow groove 51 connected to the bent portions of the identical shoulder main groove 32 open at the positions opposed to one another in the groove width direction of the shoulder main groove 32.

Additionally, the narrow shallow grooves 50 formed in the center land portion 21 and the shoulder land portion 22 adjacent to one another via the shoulder main groove 32 are disposed to be displaced in the tire circumferential direction without having the portions where the positions in the tire circumferential direction become identical positions. In other words, the center narrow shallow grooves 51 and the shoulder narrow shallow grooves 52 connected to the minor angle sides of the bends of the shoulder main groove 32 from the sides in the groove width direction opposite to one another to the shoulder main groove 32 are disposed to be offset from one another in the tire circumferential direction. Accordingly, the center narrow shallow grooves 51 formed in the center land portion 21 and the shoulder narrow shallow grooves 52 formed in the shoulder land portion 22 are disposed to be displaced from one another in the tire circumferential direction without having the portions where the positions in the tire circumferential direction become identical positions.

Note that the center narrow shallow grooves 51 formed in the center land portion 21 and the shoulder narrow shallow grooves 52 formed in the shoulder land portions 22 are preferably disposed to be displaced in the tire circumferential direction with a size ½ of a pitch in the tire circumferential direction between the center land portions 21 adjacent in the tire circumferential direction or a pitch in the tire circumferential direction between the shoulder land portions 22 adjacent in the tire circumferential direction.

Additionally, to the shoulder main groove 32 formed in the zigzag shape, the shoulder lug grooves 42 are connected to the major angle sides of the bends in the bent portions and the shoulder narrow shallow grooves 52 are connected to the minor angle sides of the bends in the bent portions, and thus the shoulder lug grooves 42 and the shoulder narrow shallow grooves 52 opening to the shoulder main groove 32 are alternately disposed in the tire circumferential direction. Furthermore, the shoulder lug grooves 42 and the shoulder narrow shallow grooves 52 are inclined in the tire circumferential direction with respect to the tire width direction in the direction opposite to the direction in which the center lug grooves 41 and the center narrow shallow grooves 51 are inclined in the tire circumferential direction with respect to the tire width direction. In other words, the shoulder narrow shallow grooves 52 have the inclination direction in the tire circumferential direction with respect to the tire width direction identical to the inclination direction of the shoulder lug grooves 42 defining the shoulder land portion 22 as the land portion 20 in which the shoulder narrow shallow grooves 52 are formed in the tire circumferential direction with respect to the tire width direction.

Specifically, the shoulder lug groove 42 includes a bent portion 42a near the end portion on the inner side in the tire width direction. The shoulder lug groove 42 is formed to be inclined in the tire circumferential direction with respect to the tire width direction at the portion between the bent portion 42a and the widened portion 43. On the other hand, the shoulder lug groove 42 is formed extending almost in the tire width direction between the bent portion 42a and the end portion of the shoulder lug groove 42. In other words, the shoulder lug groove 42 is formed substantially extending in the tire width direction in the portion between the bent portion 42a and the shoulder main groove 32. The shoulder narrow shallow groove 52 has the inclination direction in the tire circumferential direction with respect to the tire width direction identical to the inclination direction of the portion formed to be inclined in the tire circumferential direction with respect to the tire width direction between the bent portion 42a and the widened portion 43 in the shoulder lug groove 42.

Figure 10:
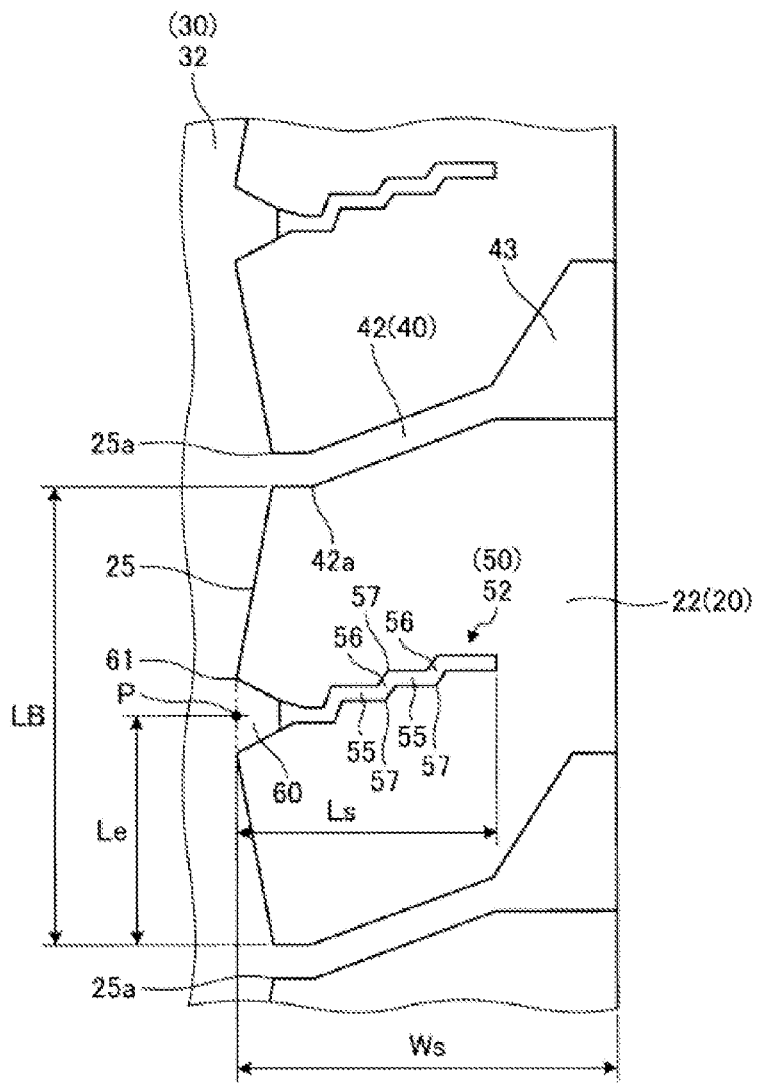
FIG. 10 is a detailed view of portion Q of FIG. 9.

FIG. 10 is a detailed view of portion Q of FIG. 9. Similarly to the center narrow shallow groove 51, the shoulder narrow shallow groove 52 formed in the shoulder land portion 22 is connected to the narrow shallow groove notch portion 60 to open to the circumferential main groove 30 via the narrow shallow groove notch portion 60. In other words, the narrow shallow groove notch portion 60 opening to the shoulder main groove 32 is formed at and near the end portion on the shoulder main groove 32 side of the shoulder narrow shallow groove 52 in the tire width direction, and the narrow shallow groove notch portion 60 opening to the shoulder main groove 32 is formed at and near the end portion on the shoulder main groove 32 side in the tire width direction in the shoulder land portion 22. To the shoulder main groove 32, the shoulder narrow shallow groove 52 is connected to the narrow shallow groove notch portion 60 from the side in the tire width direction opposite to the side where the narrow shallow groove notch portion 60, opening to the shoulder main groove 32, opens to the shoulder main groove 32, and thus the shoulder narrow shallow groove 52 opens to the shoulder main groove 32 via the narrow shallow groove notch portion 60.

Similarly to the narrow shallow groove notch portion 60 formed in the center land portion 21, the narrow shallow groove notch portion 60 formed in the shoulder land portion 22 is also formed to have the width that widens and the depth that deepens from the narrow shallow groove 50 side to the circumferential main groove 30 side. Similarly to the narrow shallow groove notch portion 60 formed in the center land portion 21, in the narrow shallow groove notch portion 60 formed in the shoulder land portion 22, the relationship between the length LB of the edge 25 of the shoulder land portion 22 in the tire circumferential direction and the length Le from the position of the width center P of the opening portion 61 of the narrow shallow groove notch portion 60 to the end portion 25a of the edge 25 in the tire circumferential direction is within the range $0.3 \leq (Le/LB) \leq 0.7$. Additionally, similarly to the center narrow shallow groove 51, the shoulder narrow shallow groove 52 also has the groove depth within the range of from not less than 1.0 mm to not greater than 3.0 mm.

Similarly to the center narrow shallow groove 51, the shoulder narrow shallow groove 52 also has the respective plurality of long portions 55 and short portions 56 formed with mutually different lengths. By connecting the long portions 55 and the short portions 56 in alternation, the shoulder narrow shallow groove 52 bends while extending in the tire width direction to form the zigzag shape. In other words, the shoulder narrow shallow groove 52 is formed in the zigzag shape in which the long portions 55 and the short portions 56 are alternately connected and the bent portions 57, which form the connecting portions between the long portions 55 and the short portions 56, are within the range of from not less than 3 locations to not greater than 10 locations.

The shoulder narrow shallow groove 52 also has the relationship between the length L1 (see FIG. 7) of the long portion 55 in the tire width direction and the length L0 (see FIG. 7) as the addition of the long portion 55 and the short portion 56 connected to one another in the tire width direction is within the range $0.5 < (L1/L0) \leq 0.9$. The value calculated by (L1/L0) of the long portions 55 and the short portions 56 other than the long portions 55 connected to the narrow shallow groove notch portions 60 has the constant size. In the shoulder narrow shallow groove 52 as well, the offset amount AL (see FIG. 7) between the long portions 55 adjacent via the short portions 56 is within the range $1.0 \text{ mm} \leq AL \leq 3.0 \text{ mm}$. The plurality of long portions 55 have the offset amount AL between the long portions 55 adjacent via the short portion 56 with the constant size.

The shoulder narrow shallow groove 52 formed in the shoulder land portions 22 has a length Ls in the tire width direction within the range of from not less than 40% to not greater than 70% of a width Ws of the shoulder land portion 22 in the tire width direction. The width Ws of the shoulder land portion 22 in the tire width direction is within the range of from not less than 20% to not greater than 25% of the development width TW (see FIG. 2) of the tread portion 2.

In this case, the length Ls of the shoulder narrow shallow groove 52 in the tire width direction is the length including the narrow shallow groove notch portion 60 to which the shoulder narrow shallow groove 52 is connected and is the length in the tire width direction adding the shoulder narrow shallow groove 52 and the narrow shallow groove notch portion 60. In other words, the length Ls of the shoulder narrow shallow groove 52 in the tire width direction is the distance in the tire width direction between the opening portion to the shoulder main groove 32 in the narrow shallow groove notch portion 60 to which the shoulder narrow shallow groove 52 is connected and the end portion in the shoulder narrow shallow groove 52 on the side terminating within the shoulder land portion 22. Additionally, the width Ws of the shoulder land portion 22 in the tire width direction is the maximum width in the tire width direction of the shoulder land portion 22 in which the shoulder narrow shallow grooves 52 are formed. The length Ls of the shoulder narrow shallow groove 52 in the tire width direction is preferably within the range of from not less than 50% to not greater than 60% to the width Ws of the shoulder land portion 22 in the tire width direction.

Figure 11:
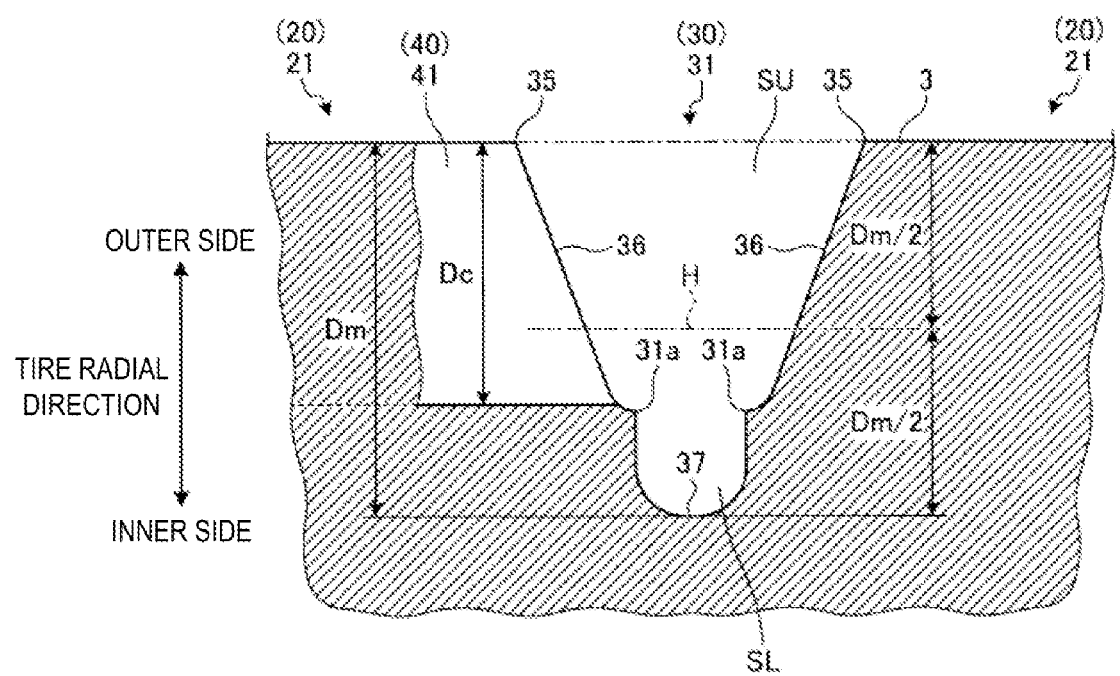
FIG. 11 is a cross-sectional view taken along R-R of FIG. 2.
Figure 12:
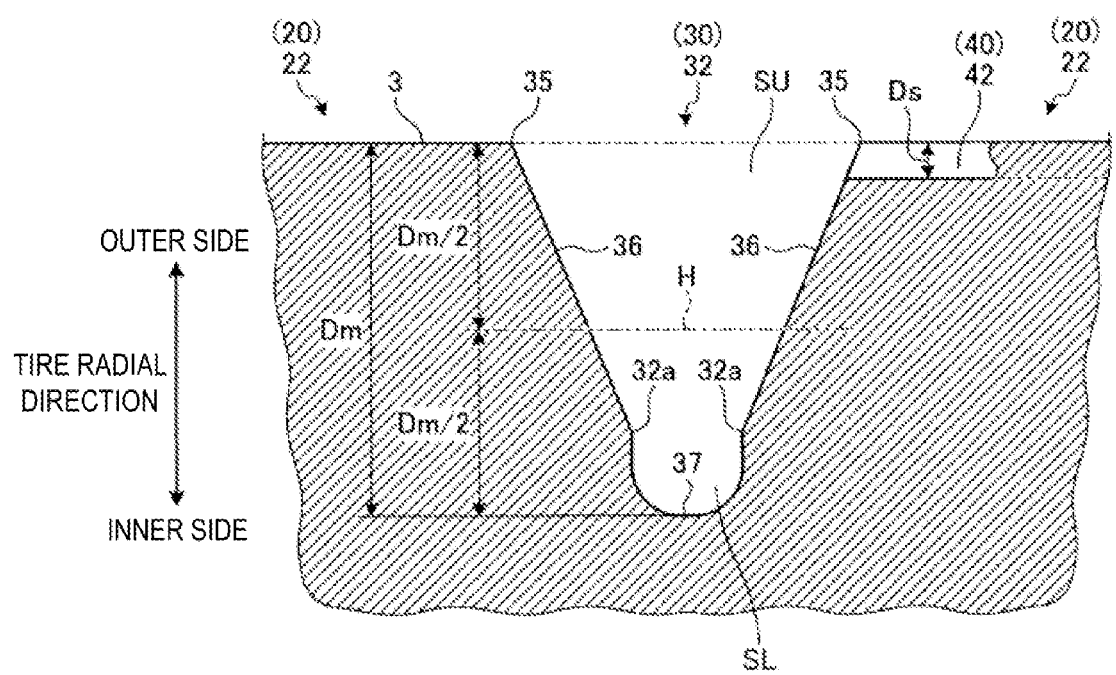
FIG. 12 is a cross-sectional view taken along U-U of FIG. 2.

FIG. 11 is a cross-sectional view taken along R-R of FIG. 2. FIG. 12 is a cross-sectional view taken along U-U of FIG. 2. In the center lug groove 41 and the shoulder lug groove 42, the groove depth of the shoulder lug groove 42 is shallower than that of the center lug groove 41. Compared to the circumferential main groove 30, the center lug groove 41 has a groove depth Dc within the range $0.50 \leq (Dc/Dm) \leq 0.90$ to the groove depth Dm of the circumferential main groove 30. On the other hand, the shoulder lug groove 42 has a groove depth Ds within the range $0.05 \leq (Ds/Dm) \leq 0.15$ to the groove depth Dm of the circumferential main groove 30. Specifically, the groove depth Dc of the center lug groove 41 is within the range of from not less than 6 mm to not greater than 11 mm, and the groove depth Ds of the shoulder lug groove 42 is within the range of from not less than 2 mm to not greater than 5 mm.

Additionally, in the circumferential main groove 30, the groove widths of both of the center main groove 31 and the shoulder main groove 32 are narrower on groove bottom 37 sides than opening portion 35 sides to the tread contact surface 3, and the groove widths generally become narrower from the opening portion 35 sides to the groove bottom 37 sides. Specifically, the center main groove 31 has step portions 31a at portions located between the opening portion 35 in groove walls 36 and the groove bottom 37, and the groove width of the center main groove 31 suddenly changes at the positions of the step portions 31a. In other words, the groove width of the center main groove 31 is substantially constant in the range from the groove bottom 37 to the positions of the step portions 31a, the groove width suddenly increases at the positions of the step portions 31a, and the groove width gradually increases from the positions of the step portions 31a to the opening portion 35 side. Additionally, the shoulder main groove 32 has bent portions 32a at portions located between the opening portion 35 in the groove walls 36 and the groove bottom 37. A change in inclination angles of the groove walls 36 at the positions of the bent portions 32a changes the groove width of the shoulder main groove 32 at the positions of the bent portions 32a. In other words, the groove width of the shoulder main groove 32 is substantially constant in the range from the groove bottom 37 to the positions of the bent portions 32a, and the groove width gradually increases from the positions of the bent portions 32a to the opening portion 35 side.

The groove widths of both of the center main groove 31 and the shoulder main groove 32 are narrower on the groove bottom 37 sides than the opening portion 35 sides, so cross-sectional areas SL on the groove bottom 37 sides demarcated by positions H ½ of the groove depths in cross-sectional views viewed in the extension directions of the respective circumferential main grooves 30 are smaller than cross-sectional areas SU on the tread contact surface 3 sides. Specifically, the cross-sectional area of the circumferential main groove 30 in the cross-sectional view viewed in the extension direction of the circumferential main groove 30 satisfies the relationship $(SL/SU) < 0.5$ between the cross-sectional area SL on the groove bottom 37 side of the circumferential main groove 30 and the cross-sectional area SU on the tread contact surface 3 side demarcated by the position H ½ of the groove depth of the circumferential main groove 30.

Figure 13:
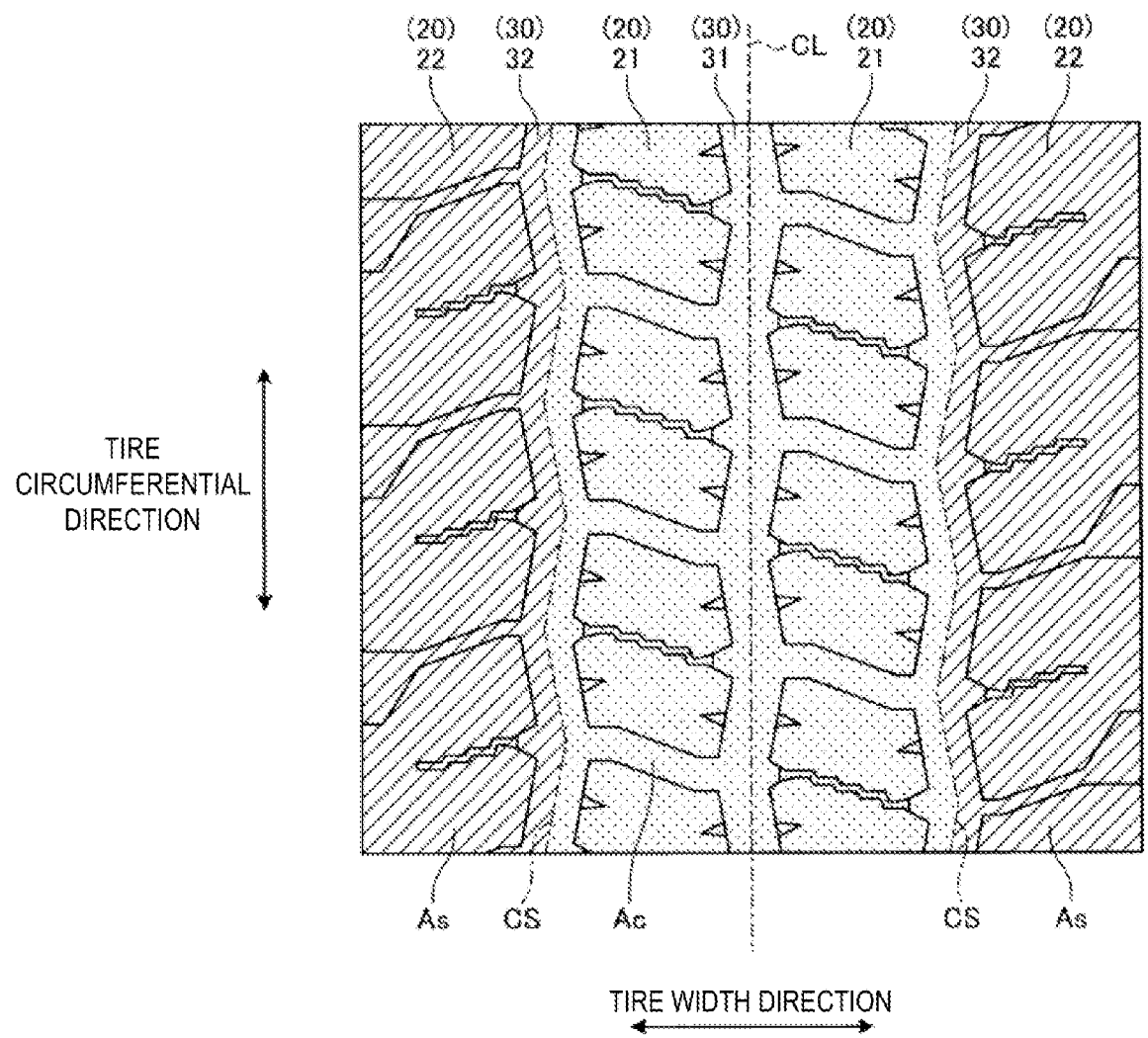
FIG. 13 is a view taken along line A-A of FIG. 1 in the direction of the arrows and is an explanatory diagram of a groove area ratio.

FIG. 13 is a view taken along line A-A of FIG. 1 in the direction of the arrows and is an explanatory diagram of a groove area ratio. In the tread portion 2, the groove area ratios differ between the outer side and the inner side of the shoulder main groove 32 in the tire width direction. The groove area ratio is greater on the inner side of the shoulder main groove 32 in the tire width direction than that of the outer side of the shoulder main groove 32 in the tire width direction. Specifically, in the tread portion 2, a groove area ratio of a range Ac between center lines CS of the shoulder main grooves 32 on both sides in the tire width direction is two times or more of a groove area ratio of a range As on the outer side in the tire width direction of the center line CS of the shoulder main groove 32. In this case, the center line CS of the shoulder main groove 32 is the center line in the groove width direction of the shoulder main groove 32, and the center line CS of the shoulder main groove 32 is also in a zigzag-like manner along the shoulder main groove 32 formed in the zigzag shape. Additionally, the range As on the outer side in the tire width direction of the center line CS of the shoulder main groove 32 is in the range from the center line CS of the shoulder main groove 32 to the position of the shoulder portion 4.

"Groove area ratio" is defined by percentage of groove area/(groove area+ground contact area). The groove area is the total of opening areas of grooves target for calculation in the ground contact surface (ground contact region). The ground contact area is measured at a contact surface between the pneumatic tire 1 and a flat plate when the pneumatic tire 1 is mounted on a regular rim, inflated to a regular internal pressure, placed perpendicular to the flat plate in a static state, and loaded with a load corresponding to a regular load. "Regular load" here refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

An application of the pneumatic tire 1 according to the present embodiment is a tire for a trailer axle. The tire for a trailer axle includes an indicator portion (not illustrated) indicative of being the tire for a trailer axle, and the indicator portion includes, for example, a mark or recesses/protrusions provided to the sidewall portion 5 of the pneumatic tire 1. When the pneumatic tire 1 according to the present embodiment is mounted on a vehicle, the pneumatic tire 1 is mounted on a rim wheel and inflated. The pneumatic tire 1 mounted on the rim wheel is mainly mounted on a trailer axle for use.

When the vehicle on which the pneumatic tires 1 are mounted is driven, the pneumatic tire 1 rotates while the tread contact surface 3 located at the bottom in the tread contact surface 3 comes into contact with the road surface. When the vehicle on which the pneumatic tires 1 are mounted travels on a dry road surface, the vehicle travels mainly by transmitting a driving force and a braking force to the road surface and generating a turning force by friction forces between the tread contact surfaces 3 and the road surface. Additionally, during traveling on wet road surfaces, water between the tread contact surface 3 and the road surface enters, for example, the circumferential main grooves 30 and the lug grooves 40, and the vehicle travels while draining the water between the tread contact surface 3 and the road surface by the grooves. As a result, the tread contact surface 3 easily contacts the road surface, and the vehicle can travel by the friction force between the tread contact surface 3 and the road surface.

Additionally, during traveling on a snow-covered road surface, the friction force between the tread contact surface 3 and the snow-covered road surface is improved using a frictional resistance with the snow-covered road surface by the edge components of the grooves formed in the tread contact surface 3. In the tread contact surface 3, in addition to the circumferential main grooves 30 and the lug grooves 40, the narrow shallow grooves 50 are formed in the center land portion 21 and the shoulder land portions 22. As a result, the friction force between the tread contact surface 3 and the snow-covered road surface can be improved also using the edge components by the narrow shallow grooves 50, in addition to the edge components by the circumferential main grooves 30 and the lug grooves 40. Accordingly, the running performance on the snow-covered road surface during traveling can be improved. At this time, because at least one end of the narrow shallow grooves 50 opens to the circumferential main grooves 30, snow can easily enter the narrow shallow grooves 50, and an edge effect, which is an effect of improving the friction force by the edge components, can be easily exhibited.

Additionally, the groove depth Dn of the narrow shallow groove 50 is within the range $0.1 \leq (Dn/Dm) \leq 0.4$ to the groove depth Dm of the circumferential main groove 30, so the edge effect can be more reliably exhibited during traveling on snow-covered road surfaces. In other words, when the groove depth Dn of the narrow shallow groove 50 is $(Dn/Dm)<0.1$ to the groove depth Dm of the circumferential main groove 30, the groove depth Dn of the narrow shallow groove 50 is too shallow, so the edge effect brought by the edge components of the narrow shallow grooves 50 is possibly difficult to be effectively exhibited. In other words, the edge effect brought by the edge components of the narrow shallow grooves 50 is exhibited when the snow on the surface layer of the snow-covered road surface enters the narrow shallow grooves 50 and the friction force in the direction intersecting with the extension directions of the edges occurs between the edges of the narrow shallow grooves 50 and the snow. However, the excessively shallow groove depths Dn of the narrow shallow grooves 50 make it difficult for the snow to enter the narrow shallow grooves 50, and this possibly makes it difficult to exhibit the edge effect. In a case where the groove depth Dn of the narrow shallow groove 50 is $(Dn/Dm)>0.4$ to the groove depth Dm of the circumferential main groove 30, the groove depth Dn of the narrow shallow groove 50 is too deep. As a result, when the land portions 20 in which the narrow shallow grooves 50 are formed come into contact with the ground and the land portions 20 deform due to a load during the ground contact, the narrow shallow grooves 50 are possibly closed. In this case, since the snow on the snow-covered road surface is less likely to enter the narrow shallow grooves 50, the edge effect brought by the edge components of the narrow shallow grooves 50 is possibly difficult to be exhibited.

In contrast, in a case where the groove depth Dn of the narrow shallow grooves 50 is within the range $0.1 \leq (Dn/Dm) \leq 0.4$ to the groove depth Dm of the circumferential main groove 30, the closing of the narrow shallow grooves 50 can be suppressed even while the land portion 20 in which the narrow shallow grooves 50 are formed comes into contact with the ground, and during traveling on snow-covered road surfaces, the snow can enter the narrow shallow grooves 50, and the edge effect brought by the edge components of the narrow shallow grooves 50 can be more reliably exhibited. Thus, the running performance during traveling on snow-covered road surfaces can be more reliably improved.

In addition, in the lug grooves 40, the minimum groove width of the center lug groove 41 is wider than the minimum groove width of the shoulder lug groove 42, so the traction performance during traveling on snow-covered road surfaces can be effectively improved. In other words, while the vehicle is traveling, a larger load is likely to act at the position close to the center in the tire width direction than positions near both ends in the tire width direction. Accordingly, a larger compression force is likely to act on the snow entering the lug grooves 40 at the position close to the center in the tire width direction than the positions near both ends in the tire width direction. As a result, a resistance between the pneumatic tire 1 and the road surface generated by snow column shear force acting on the snow that has entered the lug grooves 40 is greater at the position close to the center in the tire width direction where the larger compression force is likely to act on the snow that has entered the grooves than the positions near both ends in the tire width direction. Accordingly, when the minimum groove width of the center lug groove 41 is configured wider than the minimum groove width of the shoulder lug groove 42, the resistance between the pneumatic tire 1 and the road surface generated by snow column shear force can be effectively increased, and the traction performance during traveling on snow-covered road surfaces can be effectively improved.

On the other hand, since the minimum groove width of the shoulder lug groove 42 is narrower than the minimum groove width of the center lug groove 41, the uneven wear of the land portion 20 can be effectively suppressed. In other words, a large force in the tire width direction is likely to act on the shoulder land portions 22 located near both ends in the tire width direction while the vehicle is turning, and the deformation of the shoulder land portions 22 by the force results in non-uniform ground contact load and uneven wear is likely to occur. In the present embodiment, the minimum groove width of the shoulder lug groove 42 is narrower than the minimum groove width of the center lug groove 41, so the rigidity of the shoulder land portions 22 defined by the shoulder lug grooves 42 is increased. Accordingly, even when the large force in the tire width direction acts on the shoulder land portions 22 while the vehicle is turning, the shoulder land portions 22 are less likely to substantially deform. Accordingly, even when the large force in the tire width direction acts on the shoulder land portions 22 while the vehicle is turning, the ground contact load is less likely to be non-uniform, and uneven wear is less likely to occur. As described above, in the present embodiment, the minimum groove width of the shoulder lug grooves 42 defining the shoulder land portions 22 is narrower than the minimum groove width of the center lug grooves 41. Accordingly, the uneven wear of the shoulder land portions 22 where uneven wear is likely to occur can be suppressed, and the uneven wear of the land portions 20 can be effectively suppressed. As a result, while the decrease in uneven wear resistance is suppressed, performance on snow can be improved.

Additionally, the inclination direction of the narrow shallow grooves 50 with respect to the tire width direction is the identical direction to the inclination direction in the tire width direction of the lug grooves 40 defining the land portion 20 in which the narrow shallow grooves 50 are formed. This allows suppressing the large change in the rigidity of the portion between the lug groove 40 and the narrow shallow groove 50 in the land portion 20 depending on the position in the tire width direction. As a result, a large difference in the amount of wear of the land portions 20 caused by the difference in rigidity of the land portions 20 depending on the position in the tire width direction can be suppressed, and the uneven wear of the land portions 20 can be suppressed. This allows more reliably suppressing the decrease in uneven wear resistance.

Since the narrow shallow groove 50 is formed in the zigzag shape in which the narrow shallow groove 50 bends at three or more locations while extending in the tire width direction, the length of the edge of the narrow shallow grooves 50 can be ensured and the edge components can be increased. Additionally, since the directions of the edge components of the narrow shallow grooves 50 become the plurality of directions, an edge effect can be exhibited in more directions. Thus, the running performance on snow-covered road surfaces during traveling can be more reliably improved. Thus, performance on snow can be more reliably improved.

Additionally, the narrow shallow grooves 50 formed in the center land portion 21 and the shoulder land portion 22 adjacent to one another via the shoulder main groove 32 do not have the portions where the positions in the tire circumferential direction become identical positions and are disposed to be displaced in the tire circumferential direction. Accordingly, the position of the center land portion 21 where rigidity is lowered and the position of the shoulder land portion 22 where rigidity is lowered can be displaced in the tire circumferential direction. As a result, the rigidity of the plurality of land portions 20 can be made uniform as much as possible in the tire circumferential direction, and uneven wear caused by the difference in the rigidity of the land portions 20 can be suppressed.

Additionally, the narrow shallow grooves 50 formed in the center land portion 21 and the shoulder land portion 22 are disposed to be displaced in the tire circumferential direction without having the portions where the positions in the tire circumferential direction are the identical positions. This allows suppressing letting out a sound generated when the tread contact surface 3 comes into contact with the road surface to the outer side in the tire width direction through the narrow shallow grooves 50. This allows suppressing a vehicle external noise, which is a noise emitted to the outside of the vehicle while the vehicle is traveling. As a result, while the decrease in uneven wear resistance can be more reliably suppressed, vehicle external noise can be reduced.

Additionally, the center narrow shallow grooves 51, which are the narrow shallow grooves 50 formed in the center land portion 21, have both ends opening to the circumferential main grooves 30. This allows snow to more reliably enter the inside of the center narrow shallow grooves 51 easily and allows the edge effect to be more reliably exhibited easily. Additionally, the shoulder narrow shallow grooves 52, which are the narrow shallow grooves 50 formed in the shoulder land portion 22, have one end opening to the circumferential main groove 30 and the other end terminating within the shoulder land portion 22. As a result, while ease of the entrance of snow into the shoulder narrow shallow grooves 52 is ensured and the edge effect brought by the shoulder narrow shallow grooves 52 is ensured, the rigidity of the shoulder land portion 22 can be ensured. As a result, even when a large force in the tire width direction acts on the shoulder land portions 22 while the vehicle is turning, the large deformation of the shoulder land portions 22 can be suppressed, and the uneven wear caused by uneven ground contact load of the shoulder land portions 22 can be suppressed. As a result, while the decrease in uneven wear resistance is more reliably suppressed, performance on snow can be improved.

Additionally, the shoulder narrow shallow groove 52 formed in the shoulder land portion 22 has the length Ls in the tire width direction within the range of from not less than 40% to not greater than 70% of the width Ws of the shoulder land portion 22 in the tire width direction. Accordingly, while the uneven wear of the shoulder land portion 22 is suppressed, the running performance during traveling on snow-covered road surfaces can be improved with the shoulder narrow shallow grooves 52. In other words, when the length Ls of the shoulder narrow shallow groove 52 in the tire width direction is less than 40% of the width Ws of the shoulder land portion 22 in the tire width direction, the length Ls of the shoulder narrow shallow groove 52 is too short, which possibly makes it difficult to ensure the edge components of the shoulder narrow shallow grooves 52. In this case, the edge effect brought by the edge components of the shoulder narrow shallow grooves 52 is less likely to be exhibited, and thus the running performance during traveling on snow-covered road surfaces possibly becomes difficult to be effectively improved. In a case where the length Ls of the shoulder narrow shallow groove 52 in the tire width direction is greater than 70% of the width Ws of the shoulder land portion 22 in the tire width direction, the length Ls of the shoulder narrow shallow groove 52 is too long relative to the width Ws of the shoulder land portion 22. As a result, the rigidity of the shoulder land portion 22 is possibly difficult to be ensured. In this case, the deformation of the shoulder land portions 22 while the vehicle is turning is difficult to be suppressed, and the uneven wear caused by the non-uniform ground contact load of the shoulder land portions 22 is possibly difficult to be suppressed.

In contrast, when the length Ls of the shoulder narrow shallow groove 52 in the tire width direction is within the range of from not less than 40% to not greater than 70% of the width Ws of the shoulder land portion 22 in the tire width direction, while the rigidity of the shoulder land portion 22 is ensured, the length of the shoulder narrow shallow groove 52 can be ensured and the edge component of the shoulder narrow shallow groove 52 can be ensured. As a result, while the deformation of the shoulder land portion 22 while the vehicle is turning is suppressed and the uneven wear of the shoulder land portions 22 is suppressed, the edge effect brought by the edge components of the shoulder narrow shallow grooves 52 allows improving running performance during traveling on snow-covered road surfaces. As a result, while the decrease in uneven wear resistance is more reliably suppressed, performance on snow can be improved.

Additionally, since the groove depth Dc of the center lug groove 41 is within the range $0.50 \leq (Dc/Dm) \leq 0.90$ to the groove depth Dm of the circumferential main groove 30, while the uneven wear caused by the deformation of the center land portion 21 is suppressed, the snow column shear force by the center lug grooves 41 allows effectively improving the traction performance during traveling on snow-covered road surfaces. In other words, when the groove depth Dc of the center lug groove 41 is $(Dc/Dm)<0.50$ to the groove depth Dm of the circumferential main groove 30, since the groove depth Dc of the center lug groove 41 is too shallow, the amount of snow that can enter the center lug grooves 41 possibly becomes too small. Because the center lug grooves 41 are disposed at the positions where a large load easily acts while the vehicle is traveling, the snow column shear force acting on the snow that has entered the center lug grooves 41 has a large influence on the traction performance during traveling on snow-covered road surfaces. As a result, when the amount of snow entering the center lug grooves 41 is small, the snow column shear force, which has the large influence on the traction performance during traveling on snow-covered road surfaces, on the center lug grooves 41 becomes small, and this possibly makes it difficult to ensure the traction performance during traveling on snow-covered road surfaces. When the groove depth Dc of the center lug groove 41 is $(Dc/Dm)>0.90$ to the groove depth Dm of the circumferential main groove 30, since the groove depth Dc of the center lug groove 41 is too deep, the rigidity of the center land portion 21 defined by the center lug grooves 41 possibly becomes too low. This possibly facilitates the deformation of the center land portion 21 while the vehicle is traveling, and uneven wear is likely to occur due to the deformation of the center land portion 21.

In contrast, when the groove depth Dc of the center lug groove 41 is within the range $0.50 \leq (Dc/Dm) \leq 0.90$ to the groove depth Dm of the circumferential main groove 30, while the excessively low rigidity of the center land portion 21 is suppressed, much snow can enter the center lug grooves 41. As a result, while the uneven wear caused by the deformation of the center land portion 21 is suppressed, the snow column shear force by the center lug grooves 41 allows effectively improving the traction performance during traveling on snow-covered road surfaces. As a result, while the decrease in uneven wear resistance is more reliably suppressed, performance on snow can be improved.

Additionally, since the groove depth Ds of the shoulder lug groove 42 is within the range $0.05 \leq (Ds/Dm) \leq 0.15$ to the groove depth Dm of the circumferential main groove 30, while the uneven wear of the shoulder land portion 22 is suppressed, the snow column shear force by the shoulder lug grooves 42 allows improving the traction performance during traveling on snow-covered road surfaces. In other words, when the groove depth Ds of the shoulder lug groove 42 is $(Ds/Dm)<0.05$ to the groove depth Dm of the circumferential main groove 30, since the groove depth Ds of the shoulder lug groove 42 is too shallow, the amount of snow that can enter the shoulder lug grooves 42 possibly becomes too small. This makes it difficult to ensure the snow column shear force by the shoulder lug grooves 42, and the traction performance during traveling on snow-covered road surfaces possibly becomes difficult to be ensured. When the groove depth Ds of the shoulder lug groove 42 is $(Ds/Dm)>0.15$ to the groove depth Dm of the circumferential main groove 30, since the groove depth Ds of the shoulder lug grooves 42 is too deep, the rigidity of the shoulder land portion 22 is possibly difficult to be ensured. In this case, the deformation of the shoulder land portions 22 while the vehicle is turning is difficult to be suppressed, and the uneven wear caused by the non-uniform ground contact load of the shoulder land portions 22 is possibly difficult to be suppressed.

In contrast, when the groove depth Ds of the shoulder lug groove 42 is within the range $0.05 \leq (Ds/Dm) \leq 0.15$ to the groove depth Dm of the circumferential main groove 30, while the rigidity of the shoulder land portion 22 is ensured, snow can enter the shoulder lug grooves 42 as much as possible. As a result, while the deformation of the shoulder land portion 22 while the vehicle is turning is suppressed and the uneven wear of the shoulder land portion 22 is suppressed, the snow column shear force by the shoulder lug grooves 42 allows improving the traction performance during traveling on snow-covered road surfaces. As a result, while the decrease in uneven wear resistance is more reliably suppressed, performance on snow can be improved.

Additionally, the narrow shallow groove 50 is connected to the narrow shallow groove notch portion 60, which opens to the circumferential main groove 30 and is formed to have the width widening from the narrow shallow groove 50 side to the circumferential main groove 30 side. Thus, the narrow shallow groove 50 opens to the circumferential main groove 30 via the narrow shallow groove notch portion 60, so snow column shear force can be increased. In other words, the narrow shallow grooves 50 have a narrower groove width and a shallower groove depth compared with those of the lug grooves 40, and thus the amount of snow entering the narrow shallow grooves 50 during traveling on snow-covered road surfaces is smaller than the amount of snow entering the lug grooves 40. Accordingly, although snow column shear force is unlikely to occur in the narrow shallow grooves 50, opening the narrow shallow grooves 50 to the circumferential main grooves 30 via the narrow shallow groove notch portions 60 allows increasing the amount of snow entering the opening portions of the narrow shallow grooves 50 to the circumferential main grooves 30. As a result, the snow column shear force at the portion where the narrow shallow grooves 50 meet the circumferential main grooves 30 can be increased, and during traveling on snow-covered road surfaces, the snow column shear force at the portions where the narrow shallow grooves 50 meet the circumferential main grooves 30 can also be used in traveling. Thus, performance on snow can be more reliably improved.

Additionally, the groove area ratio of the range Ac between the center lines CS of the shoulder main grooves 32 on both sides in the tire width direction is not less than two times the groove area ratio of the range As on the outer side in the tire width direction of the center line CS of the shoulder main groove 32. Accordingly, the groove area ratio in the range where a large load easily acts while the vehicle is traveling can be increased. As a result, a large compression rate can easily act on snow that has entered the grooves, and the groove area ratio in the range where a large snow column shear force is easily generated can be increased, so a further large snow column shear force can be generated. Accordingly, the resistance between the pneumatic tire 1 and the road surface generated by snow column shear force can be effectively increased, and the traction performance during traveling on snow-covered road surfaces can be effectively improved. Thus, performance on snow can be more reliably improved.

Additionally, the center land portion 21 has the width Wc in the tire width direction within the range of from not less than 15% to not greater than 20% of the development width TW of the tread portion 2. As a result, while the uneven wear caused by the deformation of the center land portion 21 is suppressed, the traction performance during traveling on snow-covered road surfaces can be effectively improved. In other words, when the width Wc of the center land portion 21 is less than 15% of the development width TW of the tread portion 2, the width Wc of the center land portion 21 is too narrow, and this possibly makes it difficult to ensure the rigidity of the center land portion 21. This possibly facilitates the deformation of the center land portion 21 while the vehicle is traveling, and uneven wear is possibly likely to occur due to the deformation of the center land portion 21. Additionally, when the width Wc of the center land portion 21 is greater than 20% of the development width TW of the tread portion 2, the width Wc of the center land portion 21 is too wide, and this possibly makes it difficult to ensure the groove area ratio at the position near the center in the tire width direction. In this case, the groove area ratio in the range in which a large load is likely to act while the vehicle is traveling and a large snow column shear force is likely to be generated is difficult to be ensured, so this possibly makes it difficult to effectively improve traction performance during traveling on snow-covered road surfaces.

In contrast, when the width Wc of the center land portion 21 is within the range of from not less than 15% to not greater than 20% of the development width TW of the tread portion 2, while the rigidity of the center land portion 21 is ensured, the groove area ratio at the position near the center in the tire width direction where a large snow column shear force is likely to occur can be ensured. As a result, while uneven wear caused by the deformation of the center land portion 21 is suppressed, the large snow column shear force generated in the range where a large load is likely to act during traveling of the vehicle allows effectively improving the traction performance during traveling on snow-covered road surfaces. As a result, while the decrease in uneven wear resistance is more reliably suppressed, performance on snow can be improved.

Additionally, the shoulder land portion 22 has the width Ws in the tire width direction within the range of from not less than 20% to not greater than 25% of the development width TW of the tread portion 2. As a result, while the uneven wear of the shoulder land portion 22 caused by the deformation of the shoulder land portion 22 is suppressed, the traction performance during traveling on snow-covered road surfaces can be effectively improved. In other words, when the width Ws of the shoulder land portion 22 is less than 20% of the development width TW of the tread portion 2, the width Ws of the shoulder land portion 22 is too narrow, and this possibly makes it difficult to ensure the rigidity of the shoulder land portion 22. In this case, the deformation of the shoulder land portions 22 while the vehicle is turning is difficult to be suppressed, and the uneven wear caused by the non-uniform ground contact load of the shoulder land portions 22 is possibly difficult to be suppressed. Additionally, when the width Ws of the shoulder land portion 22 is greater than 25% of the development width TW of the tread portion 2, the width Ws of the shoulder land portion 22 is too wide, so the shoulder land portion 22 is disposed up to the position near the center, and this possibly makes it difficult to ensure the groove area ratio at the position near the center in the tire width direction. In this case, the groove area ratio in the range in which a large load is likely to act while the vehicle is traveling and a large snow column shear force is likely to be generated is difficult to be ensured, so this possibly makes it difficult to effectively improve traction performance during traveling on snow-covered road surfaces.

In contrast, when the width Ws of the shoulder land portion 22 is within the range of from not less than 20% to not greater than 25% of the development width TW of the tread portion 2, while the rigidity of the shoulder land portion 22 is ensured, the groove area ratio at the position near the center in the tire width direction where a large snow column shear force is likely to occur can be ensured. As a result, while the deformation of the shoulder land portions 22 while the vehicle is turning is suppressed and the uneven wear of the shoulder land portions 22 is suppressed, the large snow column shear force generated in the range where a large load is likely to act during traveling of the vehicle allows effectively improving the traction performance during traveling on snow-covered road surfaces. As a result, while the decrease in uneven wear resistance is more reliably suppressed, performance on snow can be improved.

In addition, since the long portions 55 and the short portions 56 are alternately connected in the narrow shallow groove 50, the length of the edge can be ensured and the edge components can be increased. Additionally, since the directions of the edge components become the plurality of directions, an edge effect can be exhibited in more directions. Thus, performance on snow can be more reliably improved.

In addition, since the bent portions 57, which form the connecting portions between the long portions 55 and the short portions 56, are within the range of from not less than 3 locations to not greater than 10 locations in the narrow shallow groove 50, while the uneven wear of the land portion 20 is suppressed, the running performance during traveling on snow-covered road surfaces can be effectively improved. In other words, when the bent portions 57 of the narrow shallow groove 50 are less than three locations, the number of bent portions 57 is too small, so even when the long portions 55 and the short portions 56 are provided in the narrow shallow groove 50, the edge components are possibly difficult to be effectively increased. In addition, when the number of bent portions 57 in the narrow shallow groove 50 is greater than 10 locations, the number of bent portions 57 is too large, so the rigidity of the portions in the land portion 20 where the narrow shallow grooves 50 are disposed is possibly likely to be decrease. In this case, due to the rigidity of the land portions 20 being partially decreased, uneven wear is possibly likely to occur.

In contrast, when the bent portions 57 of the narrow shallow groove 50 are within the range of from not less than 3 locations to not greater than 10 locations, while the decrease in the rigidity of the portions in the land portion 20 where the narrow shallow grooves 50 are disposed is suppressed, the edge components of the narrow shallow grooves 50 can be effectively increased. As a result, while the uneven wear of the land portions 20 is suppressed, the increased edge effect brought by the edge components of the narrow shallow grooves 50 allows effectively improving the running performance during traveling on snow-covered road surfaces. As a result, while the decrease in uneven wear resistance is more reliably suppressed, performance on snow can be improved.

Additionally, since the circumferential main groove 30 meets the relationship of (SL/SU)<0.5 between the cross-sectional area SL on the groove bottom 37 side and the cross-sectional area SU on the tread contact surface 3 side of the circumferential main groove 30 demarcated by the position H ½ of the groove depth of the circumferential main groove 30, while ease of entrance of snow to the circumferential main groove 30 is ensured, a reach of a stone entering the circumferential main groove 30 to the groove bottom 37 can be suppressed. In other words, in a case where the relationship between the cross-sectional area SL on the groove bottom 37 side and the cross-sectional area SU on the tread contact surface 3 side of the circumferential main groove 30 is (SL/SU)≥0.5, the cross-sectional area SL on the groove bottom 37 side is too large. Accordingly, a stone that has entered the circumferential main groove 30 is likely to reach the groove bottom 37, which possibly makes it easy for stone drilling to occur. Alternatively, in a case where the relationship between the cross-sectional area SL on the groove bottom 37 side and the cross-sectional area SU on the tread contact surface 3 side of the circumferential main groove 30 is (SL/SU)≥0.5, the cross-sectional area SU on the tread contact surface 3 side is too small. This possibly makes it difficult for snow to enter the circumferential main groove 30 during traveling on snow-covered road surfaces, which possibly makes it difficult to improve the running performance during traveling on snow-covered road surfaces.

In contrast, in a case where the cross-sectional area SL on the groove bottom 37 side and the cross-sectional area SU on the tread contact surface 3 side of the circumferential main groove 30 meet the relationship (SL/SU)<0.5, while ease of entrance of snow to the circumferential main groove 30 is ensured, a reach of a stone entering the circumferential main groove 30 to the groove bottom 37 can be suppressed. As a result, while stone drilling is suppressed, performance on snow can be improved.

Modified Examples

Note that while in the embodiment described above, the narrow shallow groove 50 having the respective plurality of long portions 55 and short portions 56 has the value calculated by (L1/L0) with the constant size, the narrow shallow groove 50 may be formed with a plurality of sizes of (L1/L0). That is, the narrow shallow groove 50 may have a shape in which the value of (L1/L0) calculated using the length L1 of the long portion 55 in the tire width direction and the length L0 as the addition of the long portion 55 and the short portion 56 connected to one another in the tire width direction has a plurality of sizes in one narrow shallow groove 50.

Additionally, in the embodiment described above, the narrow shallow groove 50 has the offset amounts AL between the long portions 55 adjacent via the short portions 56 with the constant size. However, the narrow shallow groove 50 may have the shape in which the offset amounts AL between the long portions 55 adjacent via the short portions 56 are formed with a plurality of sizes. In the narrow shallow groove 50, the lengths of the long portions 55 and the short portions 56 are preferably appropriately set according to, for example, the shape of the land portion 20 in which the narrow shallow grooves 50 are formed, the arrangement of the land portions 20 in the tread portion 2, and the disposed positions of the narrow shallow grooves 50 in the land portion 20. The formation of the narrow shallow groove 50 by setting the lengths of the long portions 55 and the short portions 56 according to these configurations allows the edge effect during traveling on snow-covered road surfaces to be more reliably exhibited by the edge components of the narrow shallow grooves 50 in which the lengths of the long portions 55 and the short portions 56 are optimized, and stress concentration by the load acting on the narrow shallow grooves 50 can be appropriately suppressed. As a result, while the decrease in uneven wear resistance is more reliably suppressed, performance on snow can be improved.

Figure 14:
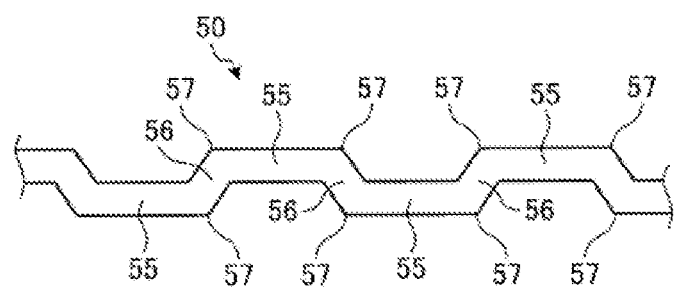
FIG. 14 is a modified example of a pneumatic tire according to an embodiment and is an explanatory diagram in a case where a narrow shallow groove is formed in an amplitude configuration.

In the embodiment described above, in the narrow shallow groove 50, the two short portions 56 connected to both ends of one long portion 55 have the directions extending from the long portion 55 in the tire circumferential direction opposite from one another, but the narrow shallow groove 50 may be formed in a shape other than that. FIG. 14 is a modified example of the pneumatic tire 1 according to the embodiment and is an explanatory diagram in a case where the narrow shallow groove 50 is formed in an amplitude configuration. For example, as illustrated in FIG. 14, in the narrow shallow groove 50, the two short portions 56 connected to both ends of one long portion 55 may have the directions extending from the long portion 55 in the tire circumferential direction formed to be identical to one another. In other words, the narrow shallow groove 50 may be formed in a shape in which the narrow shallow groove 50 bends at the bent portions 57 while extending in the direction along the long portions 55 and repeatedly amplitudes by the short portions 56. As long as the long portions 55 and the short portions 56 are alternately connected, the narrow shallow grooves 50 may have any shape.

In addition, the bent portion 57 of the narrow shallow groove 50 may be formed in an angular shape by connecting the long portion 55 and the short portion 56 in a straight line, and the bent portion 57 may be formed in an arcuate shape by connecting the long portion 55 and the short portion 56 via a small arc.

Additionally, while the narrow shallow grooves 50 are formed in all of the land portions 20 formed in the block shape in the embodiment described above, the narrow shallow grooves 50 need not to be formed in all of the land portions 20. In consideration of uneven wear resistance and performance on snow, the narrow shallow grooves 50 are preferably formed in the land portions 20 where the effect can be expected.

In the embodiment described above, although the pneumatic tire 1 is used for description as an example of the tire according to the embodiment of the present technology, the tire according to the embodiment of the present technology may be a tire other than the pneumatic tire 1. The tire according to the embodiment of the present technology may be, for example, a so-called airless tire that can be used without filling a gas.

Examples

FIGS. 15A-15D are tables showing results of performance evaluation tests of tires. In relation to the tire described above, the evaluation tests of performance conducted on a tire of Conventional Example, tires according to the embodiments of the present technology, and tires according to Comparative Examples for comparison with the tires according to the embodiments of the present technology will be described below. In the performance evaluation tests, tests on performance on snow, which is the running performance on snow-covered road surfaces, and uneven wear resistance, which is unlikelihood of causing uneven wear, were conducted.

The performance evaluation tests were conducted using pneumatic tires filled with air for use, tires having a tire nominal specified by JATMA of 265/70R19.5 size were mounted on rim wheels of regular rims specified by JATMA, and the air pressures were adjusted to the maximum air pressure specified by JATMA for use.

As the evaluation method for each test item, performance on snow was evaluated in accordance with an ECE (Economic Commission for Europe) Regulation No. 117 Revision 2 (ECE R117-02), a distance required for acceleration from a regulated initial speed to a termination speed on snow-covered road surfaces was measured to calculate an acceleration, and the calculated acceleration is expressed as index values with Conventional Example described later being assigned the value of 100. Larger values indicate superior acceleration performance on snow-covered road surfaces and higher performance on snow.

Additionally, regarding uneven wear resistance, a test vehicle to which the test tires were mounted was traveled for 50000 km, and after that, an occurrence status of uneven wear in the land portions was measured. Specifically, a difference in an amount of wear between the center land portion and the shoulder land portion was measured, and a reciprocal of the difference in the measured amount of wear is expressed as an index value with Comparative Example described later being assigned the value of 100. A larger value indicates a smaller difference in amount of wear and excellent uneven wear resistance.

The performance evaluation tests were conducted on 26 types of tires: the tire of Conventional Example as an example of the conventional tire, Examples 1 to 23 as examples of the tires according to the embodiments of the present technology, and Comparative Examples 1 and 2 as examples of the tires compared with the tires according to the embodiments of the present technology. Among them, although the tire of Conventional Example has the groove depth Dn of a narrow shallow groove within the range $0.1 \leq (Dn/Dm) \leq 0.4$ to the groove depth Dm of a circumferential main groove, the minimum groove width of a center lug groove is not wider than the minimum groove width of a shoulder lug groove. In the tires of Comparative Examples 1 and 2, although the minimum groove width of a center lug groove is wider than the minimum groove width of a shoulder lug groove, the groove depth Dn of a narrow shallow groove is not within the range $0.1 \leq (Dn/Dm) \leq 0.4$ to the groove depth Dm of a circumferential main groove.

In contrast, in Examples 1 to 23 as examples of the tires according to the embodiments of the present technology, the groove depths Dn of the narrow shallow grooves 50 formed in the land portions 20 are all within the range $0.1 \leq (Dn/Dm) \leq 0.4$ to the groove depths Dm of the circumferential main grooves, and the minimum groove width of the center lug groove 41 is wider than the minimum groove width of the shoulder lug groove 42. Furthermore, the tires according to Example 1 to 23 each differ in whether the inclination direction of the narrow shallow groove 50 in the tire circumferential direction with respect to the tire width direction is identical to the inclination direction of the lug groove 40 in the tire circumferential direction with respect to the tire width direction, the number of bent portions 57 of the narrow shallow groove 50, whether the narrow shallow grooves 50 formed in the center land portion 21 and the shoulder land portions 22 are disposed to be displaced in the tire circumferential direction without having the portions where the positions in the tire circumferential direction become identical positions, the opening end of the narrow shallow groove 50 formed in the shoulder land portion 22 opening to the circumferential main groove 30, the length Ls of the narrow shallow groove 50 in the tire width direction formed in the shoulder land portion 22 to the width Ws of the shoulder land portion 22 in the tire width direction, the ratio (Dc/Dm) of the groove depth Dc of the center lug groove 41 to the groove depth Dm of the circumferential main groove 30, the ratio (Ds/Dm) of the groove depth Ds of the shoulder lug groove 42 to the groove depth Dm of the circumferential main groove 30, the presence of the narrow shallow groove notch portion 60, the groove area ratio of the range Ac between the center lines CS of the shoulder main grooves 32 to the groove area ratio of the range As on the outer side in the tire width direction of the center line CS of the shoulder main groove 32, the width Wc of the center land portion 21 in the tire width direction to the development width TW of the tread portion 2, and the width Ws of the shoulder land portion 22 in the tire width direction to the development width TW of the tread portion 2.

As a result of performing the performance evaluation tests using these tires, as shown in FIGS. 15A-15D, it was found that the tires according to Example 1 to 23 can improve performance on snow without reducing uneven wear resistance compared with those of Conventional Example and Comparative Examples 1 and 2. That is, in the tires according to Examples 1 to 23, while the decrease in uneven wear resistance is suppressed, performance on snow can be improved.

The invention claimed is:

1. A tire, comprising:
   three circumferential main grooves disposed side by side in a tire width direction and extending in a tire circumferential direction;
   lug grooves extending in the tire width direction, each of the lug grooves having at least one end opening to one of the circumferential main grooves;
   land portions defined by the circumferential main grooves and the lug grooves,
   among the three circumferential main grooves, the circumferential main groove disposed at a center in the tire width direction is defined as a center main groove and the circumferential main grooves disposed on both sides of the center main groove in the tire width direction are defined as shoulder main grooves, and among the land portions, the land portions disposed on an inner side of the shoulder main grooves in the tire width direction are defined as center land portions and the land portions disposed on an outer side of the shoulder main grooves in the tire width direction are defined as shoulder land portions, narrow shallow grooves being formed in the center land portions and the shoulder land portions, each of the narrow shallow grooves having at least one end opening to the circumferential main groove, each of the narrow shallow grooves having a groove depth Dn within a range $0.1 \leq (Dn/Dm) \leq 0.4$ to a groove depth Dm of the circumferential main grooves, and
   the lug grooves comprising shoulder lug grooves and center lug grooves, the shoulder lug grooves being disposed on an outer side of the shoulder main grooves in the tire width direction, each of the shoulder lug grooves having one end opening to the shoulder main grooves, the center lug grooves being disposed between the center main groove and the shoulder main grooves, each of the center lug grooves having both ends opening to the circumferential main grooves, the center lug grooves having a minimum groove width wider than a minimum groove width of the shoulder lug grooves;
   wherein
   the center lug grooves include center lug grooves on both sides of a tire equator, the center lug grooves on both sides of the tire equator having a same direction of inclination with respect to the tire circumferential direction,
   the narrow shallow grooves formed in the center land portions have both ends opening to the circumferential main grooves,
   the narrow shallow grooves formed in the shoulder land portions have one end opening to one of the circumferential main grooves and another end terminating within the shoulder land portions,
   an inclination direction of the narrow shallow grooves in the tire circumferential direction with respect to the tire width direction is a direction identical to an inclination direction of the lug grooves in the tire circumferential direction with respect to the tire width direction, and
   the lug grooves define the land portions in which the narrow shallow grooves are formed.

2. The tire according to claim 1, wherein the narrow shallow grooves are formed in a zigzag shape in which the narrow shallow grooves bend at three or more locations while extending in the tire width direction.

3. The tire according to claim 1, wherein the narrow shallow grooves formed in the center land portions and the shoulder land portions adjacent to one another via the shoulder main grooves are disposed to be displaced in the tire circumferential direction without having portions where positions in the tire circumferential direction become identical positions.

4. The tire according to claim 1, wherein the narrow shallow grooves formed in the shoulder land portions have a length in the tire width direction within a range of from not less than 40% to not greater than 70% of a width of the shoulder land portions in the tire width direction.

5. The tire according to claim 1, wherein the center lug grooves have a groove depth Dc within a range $0.50 \leq (Dc/Dm) \leq 0.90$ to the groove depth Dm of the circumferential main grooves, and the shoulder lug grooves have a groove depth Ds within a range $0.05 \leq (Ds/Dm) \leq 0.15$ to the groove depth Dm of the circumferential main grooves.

6. The tire according to claim 1, wherein the narrow shallow grooves are connected to a narrow shallow groove notch portion to open to the circumferential main grooves via the narrow shallow groove notch portion, the narrow shallow groove notch portion is a notch opening to the circumferential main grooves, and the narrow shallow groove notch portion is formed to have a width that widens from a narrow shallow groove side to a circumferential main groove side.

7. The tire according to claim 1, wherein a groove area ratio of a range between center lines of the shoulder main grooves on both sides in the tire width direction is two times or more of a groove area ratio on an outer side in the tire width direction of the center lines of the shoulder main grooves.

8. The tire according to claim 1, wherein the center land portions have a width in the tire width direction within a range of from not less than 15% to not greater than 20% of a development width of a tread portion, and the shoulder land portions have a width in the tire width direction within a range of from not less than 20% to not greater than 25% of the development width.

9. The tire according to claim 1, wherein in the narrow shallow grooves, long portions and short portions are alternately connected, and bent portions forming connecting portions between the long portions and the short portions are within a range of from not less than 3 locations to not greater than 10 locations.

10. The tire according to claim 1, wherein a cross-sectional area of the circumferential main grooves in a cross-sectional view viewed in an extension direction of the circumferential main grooves satisfies a relationship $(SL/SU) < 0.5$ between a cross-sectional area SL on a groove bottom side of the circumferential main grooves and a cross-sectional area SU on a tread contact surface side demarcated by a position ½ of a groove depth of the circumferential main grooves.

11. The tire according to claim 2, wherein the narrow shallow grooves formed in the center land portions and the shoulder land portions adjacent to one another via the shoulder main grooves are disposed to be displaced in the tire circumferential direction without having portions where positions in the tire circumferential direction become identical positions.

12. The tire according to claim 2, wherein the narrow shallow grooves formed in the shoulder land portions have a length in the tire width direction within a range of from not less than 40% to not greater than 70% of a width of the shoulder land portions in the tire width direction.

13. The tire according to claim 12, wherein the center lug grooves have a groove depth Dc within a range $0.50 \leq (Dc/Dm) \leq 0.90$ to the groove depth Dm of the circumferential main grooves, and the shoulder lug grooves have a groove depth Ds within a range $0.05 \leq (Ds/Dm) \leq 0.15$ to the groove depth Dm of the circumferential main grooves.

14. The tire according to claim 13, wherein the narrow shallow grooves are connected to a narrow shallow groove notch portion to open to the circumferential main grooves via the narrow shallow groove notch portion, the narrow shallow groove notch portion is a notch opening to the circumferential main grooves, and the narrow shallow groove notch portion is formed to have a width that widens from a narrow shallow groove side to a circumferential main groove side.

15. The tire according to claim 14, wherein a groove area ratio of a range between center lines of the shoulder main grooves on both sides in the tire width direction is two times or more of a groove area ratio on an outer side in the tire width direction of the center lines of the shoulder main grooves.

16. The tire according to claim 15, wherein the center land portions have a width in the tire width direction within a range of from not less than 15% to not greater than 20% of a development width of a tread portion, and the shoulder land portions have a width in the tire width direction within a range of from not less than 20% to not greater than 25% of the development width.

17. The tire according to claim 1, wherein each of the narrow shallow grooves has a width of from 2.0 to 3.0 mm.

18. The tire according to claim 7, wherein the groove area ratio of the range between center lines of the shoulder main grooves on both sides in the tire width direction is less than three times the groove area ratio on the outer side in the tire width direction of the center lines of the shoulder main grooves.

19. A tire, comprising:
three circumferential main grooves disposed side by side in a tire width direction and extending in a tire circumferential direction;
lug grooves extending in the tire width direction, each of the lug grooves having at least one end opening to one of the circumferential main grooves;
land portions defined by the circumferential main grooves and the lug grooves,
among the three circumferential main grooves, the circumferential main groove disposed at a center in the tire width direction is defined as a center main groove and the circumferential main grooves disposed on both sides of the center main groove in the tire width direction are defined as shoulder main grooves, and among the land portions, the land portions disposed on an inner side of the shoulder main grooves in the tire width direction are defined as center land portions and the land portions disposed on an outer side of the shoulder main grooves in the tire width direction are defined as shoulder land portions, narrow shallow grooves being formed in the center land portions and the shoulder land portions, each of the narrow shallow grooves having at least one end opening to the circumferential main groove, each of the narrow shallow grooves having a groove depth Dn within a range $0.1 \leq (Dn/Dm) \leq 0.4$ to a groove depth Dm of the circumferential main grooves, and the lug grooves comprising shoulder lug grooves and center lug grooves, the shoulder lug grooves being disposed on an outer side of the shoulder main grooves in the tire width direction, each of the shoulder lug grooves having one end opening to the shoulder main grooves, the center lug grooves being disposed between the center main groove and the shoulder main grooves, each of the center lug grooves having both ends opening to the circumferential main grooves, the center lug grooves having a minimum groove width wider than a minimum groove width of the shoulder lug grooves; wherein the center lug grooves include center lug grooves on both sides of a tire equator, the center lug grooves on both sides of the tire equator having a same direction of inclination with respect to the tire circumferential direction, the narrow shallow grooves formed in the center land portions have both ends opening to the circumferential main grooves, the narrow shallow grooves formed in the shoulder land portions have one end opening to one of the circumferential main grooves and another end terminating within the shoulder land portions, the center land portions have a width in the tire width direction within a range of from not less than 15% to not greater than 20% of a development width of a tread portion, and the shoulder land portions have a width in the tire width direction within a range of from not less than 20% to not greater than 25% of the development width.

* * * * *